US007794690B2

(12) United States Patent
Abatzoglou et al.

(10) Patent No.: US 7,794,690 B2
(45) Date of Patent: Sep. 14, 2010

(54) CARBON SEQUESTRATION AND DRY REFORMING PROCESS AND CATALYSTS TO PRODUCE SAME

(75) Inventors: Nicolas Abatzoglou, Rock Forest (CA); François Gitzhofer, Rock Forest (CA); Jasmin Blanchard, Fleurimont (CA); Karine De Oliveira Vigier, Limoges (FR); Denis Gravelle, Sherbrooke (CA)

(73) Assignee: Socpra Sciences Et Genie s.e.c., Sherbrooke (Qc)

( * ) Notice: Subject to any disclaimer, the term of this patent is extended or adjusted under 35 U.S.C. 154(b) by 696 days.

(21) Appl. No.: 11/099,529

(22) Filed: Apr. 6, 2005

(65) Prior Publication Data
US 2005/0220695 A1   Oct. 6, 2005

Related U.S. Application Data

(60) Provisional application No. 60/559,440, filed on Apr. 6, 2004.

(51) Int. Cl.
*C01B 31/00* (2006.01)
*C01B 31/02* (2006.01)
*C01B 3/26* (2006.01)
*D01F 9/12* (2006.01)
*B01J 23/00* (2006.01)
*B01J 23/40* (2006.01)
*B01J 23/42* (2006.01)

(52) U.S. Cl. .................. 423/651; 423/445 R; 423/447.1; 423/447.2; 502/300; 502/326

(58) Field of Classification Search .............. 423/447.2, 423/445 R, 230, 650, 651, 652, 653, 654, 423/648.1; 422/122, 125; 502/326, 319, 502/256, 300; 510/186, 254, 272, 362, 435, 510/326; 252/373; 134/39; 429/17
See application file for complete search history.

(56) References Cited

U.S. PATENT DOCUMENTS

| 2,843,509 | A | * | 7/1958 | Arden ......................... 134/39 |
| 3,931,045 | A | * | 1/1976 | Rush ........................... 502/319 |
| 4,132,065 | A | | 1/1979 | McGann |
| 5,032,568 | A | | 7/1991 | Lau et al. |
| 5,431,855 | A | | 7/1995 | Green et al. |
| 5,609,921 | A | | 3/1997 | Gitzhofer et al. |
| 5,829,139 | A | | 11/1998 | Murphy et al. |
| 5,928,805 | A | * | 7/1999 | Singh et al. .................. 429/13 |
| 6,669,744 | B2 | | 12/2003 | Allam et al. |

(Continued)

FOREIGN PATENT DOCUMENTS

WO    WO 00/09441    2/2000

OTHER PUBLICATIONS

Tomishige et al. Studies on carbon deposition in CO2 reforming of CH4 over nickel-magnesia solid solution catalysts. Journal of Catalysis 181, 91-103 (1999).*

(Continued)

*Primary Examiner*—Jerry Lorengo
*Assistant Examiner*—Jennifer A Smith
(74) *Attorney, Agent, or Firm*—Ogilvy Renault, LLP

(57) ABSTRACT

A carbon sequestration and dry reforming process for the production of synthesis gas and sequestered carbon from carbon dioxide. Two-dimension catalysts for sequestering carbon and a process to produce same. A method for activating two dimension catalysts.

41 Claims, 13 Drawing Sheets

U.S. PATENT DOCUMENTS

| | | | |
|---|---|---|---|
| 6,852,668 | B2 | 2/2005 | de Lasa et al. |
| 7,025,903 | B2 * | 4/2006 | Grieve et al. ............... 252/373 |
| 2005/0054738 | A1 | 3/2005 | Fraenkel |
| 2005/0220695 | A1 * | 10/2005 | Abatzoglou et al. ..... 423/445 R |
| 2007/0253886 | A1 * | 11/2007 | Abatzoglou et al. ..... 423/445 R |

OTHER PUBLICATIONS

Courson et al. Development of ni catalysts for gas production from biomass gasification. Reactivity in steam and dry-reforming. Catalysis Today 63, 427-437 (2000).*

Sone et al. A study of carbon deposition on fuel cell power plants. Journal of Power Sources (86) 2000 334-339.*

Tibbetts, G.G. "Carbon fibers produced by pyrolysis of natural gas in stainless steel tubes". Appl. Phys. Lett., vol. 42, No. 8. Apr. 15, 1983.*

Chen and Yuen, Oxidation of Low-Carbon, Low-Silicon Mild Steel at 450-900° C Under Conditions Relevant to Hot-Strip Processing; Oxidation of Metals: Feb. 2002; pp. 53-79; vol. 57, Nos. 1/2; Plenum Publishing Corp.

Renshaw, Roscoe and Walker; Disproportionation of CO; Journal of Catalysts; 1970; pp. 164-183; vol. 18.

Chen and Yuen; Review of the High-Temperature Oxidation of Iron and Carbon Steels in Air or Oxygen; Oxidation of Metals; Jun. 2003; pp. 433-468; vol. 59; Nos. 5/6; Plenum Publishing Corp.

Abuluwefa, Guthrie and Ajersch; Oxidation of Low Carbon Steel In Multicomponent Gases: Part II. Reaction Mechanisms during Isothermal Oxidation; Metallurgical and Materials Transactions A; Aug. 1997; pp. 1633-1641; vol. 28A.

Abuluwefa, Guthrie and Ajersch; Oxidation of Low Carbon Steel in Multicomponent Gases: Part I. Reaction Mechanisms during Isothermal Oxidation; Metallurgical and Materials Transactions A; Aug. 1997; pp. 1643-1651; vol. 28A.

Abatzoglou, N. et al, "The Use of Catalytic Reforming Reactions for $CO_2$ Sequestration as Carbon Nanotubes", Proceedings of the 2006 IAME/WSEAS International Conference on Energy & Environmental Systems, 2006, pp. 21-26, Chalkida, Greece.

Rostrup-Nielsen, J.R. & Sehested, J., "Hydrogen and Synthesis Gas by Steam—and $CO_2$ Reforming", Adv. Catal., 2002, pp. 65-139, vol. 47, Elsevier Science, USA.

De Oliveira-Vigier K. et al., 2005, "Dry-Reforming of Ethanol in the Presence of a 316 Stainless Steel Catalyst", The Canadian Journal of Chemical Engineering, vol. 83, pp. 978-984.

Jankhah S. et al., 2008, "Thermal and Catalytic dry Reforming and Cracking of Ethanol for Hydrogen and Carbon Nanofilaments' production", International Journal of Hydrogen Energy, vol. 33, pp. 4769-4779.

Nielsen-Rostrup R. Jens, 1984, "Catalytic Steam Reforming", Catalysis—Science and Technology, vol. 5, pp. 1-31.

Ruckenstein E. et al., 1995, "Carbon Dioxide Reforming of Methane over Nickel/Alkaline Earth Metal Oxide Catalysts", Applied Catalysis A: General, vol. 133, pp. 149-161.

Keller N. et al., 1999, "Influence of the preparation conditions on the synthesis of high surface area SiC for use as a heterogeneous catalyst support.", Journal of Materials Science, 34: 3189-3202.

Krishnamurthy S. et al., 2008, "Growth of Carbon Nanotubes on Si Substrate Using Fe Catalyst Produced by Pulsed Laser Deposition.", Journal of Nanoscience and Nanotechnology, vol. 5748-5752.

Masel R. I., 2001, "Chemical Kinetics and Catalysis.", John Wiley and Sons, NY, pp. 700-702.

Fogler H. S., 2004, "Elements of Chemical Reaction Engineering.", Pearson Education ed., International Edition, pp. 646-649.

Halmann, M. "Chemical Fixation of Carbon Dioxide". CRC Press (1993) pp. 33-55.

Weiss, W. "An integrated surface science approach towards metal oxide catalysis". Topics in Catalysis 13 (2002) pp. 75-90.

Tibbetts, G.G. "Carbon fibers produced by pyrolysis of natural gas in stainless steel tubes". Appl. Phys. Lett., vol. 42, No. 8. Apr. 15, 1983.

Azom.com "Stainless Steel-Grade 304" (2003).

* cited by examiner

CARBON SEQUESTRATION AND DRY REFORMING PROCESS AND CATALYSTS TO PRODUCE SAME

CROSS-REFERENCE TO RELATED APPLICATIONS

This application claims priority of U.S. provisional patent application No. 60/559,440 filed on Apr. 6, 2004, the specification of which is hereby incorporated by reference.

BACKGROUND OF THE INVENTION

1) Field of the Invention

The present invention relates to a process to sequester carbon from organic material and, more particularly, to a dry reforming process maximizing the carbon recovery. It also relates to new catalysts for carbon sequestration and dry reforming processes.

2) Description of the Prior Art

Synthesis gas is a mixture composed primarily of hydrogen and carbon monoxide. Synthesis gas is used either in pure hydrogen production, as a raw material in the chemical industry for the manufacture of market valuable products or as an energy vector. It can also be converted to a solid or liquid synthetic fuel or "synfuel".

Steam reforming reactions are widely used for the production of hydrogen streams and synthesis gas for a number of processes such as ammonia, methanol and Fischer-Tropsh process for the synthesis of carbon-containing compounds such as higher hydrocarbons.

Dry reforming with $CO_2$ is also a known process to produce or refine synthesis gas but there are so far no industrial applications due to the high endothermicity of reactions. For example, the reduction of carbon dioxide with methane is an endothermic reaction ($\Delta H_{298}=+247$ kJ·mol$^{-1}$). At high temperatures, its favorable entropy change ($\Delta S_{298}=+257$ J·K$^{-1}$·mol$^{-1}$) makes it a favorable equilibrium, $\Delta G_{1050}=-23$ kJ·mol$^{-1}$.

$$CH_{4(g)} + CO_{2(g)} \rightarrow 2CO_{(g)} + 2H_{2(g)} \quad (1)$$

During dry reforming, the CO is also partially converted into solid carbon through the reaction known as Boudouard reaction for CO disproportionation:

$$2CO_{(g)} \rightarrow CO_{2(g)} + C_{(s)} \quad (2)$$

Several technical problems occur during dry reforming due to the carbon formation. Therefore, most prior art documents focus on processes, reactions and catalytic systems aiming at the reduction of the carbon deposition during dry reforming.

If the carbon formation is undesired from a process point of view, it is however advantageous from an environmental point of view since carbon dioxide is a greenhouse effect gas (GHG). The amount of carbon formed during dry reforming is reduced the release of carbon dioxide in atmosphere, reducing thereby the GHG emission.

SUMMARY OF THE INVENTION

Accordingly, an object of the present invention is to provide a process for sequestering carbon from carbon dioxide for reducing greenhouse effect gas emissions.

Yet another object of the present invention is to provide a class of catalysts that is capable of reforming organic gases to carbon monoxide and hydrogen while generating carbon deposits.

Still another object of the present invention is to provide a process for dry reforming renewable resources while simultaneously sequestering carbon.

According to one object of the present invention, there is provided a carbon sequestration and dry reforming process. The process comprises the steps of: providing a reactant gas mixture including carbon dioxide and an organic material; providing at least one catalyst for dry reforming the reactant gas mixture and sequestering carbon, at least one of the at least one catalyst being a two-dimension carbon sequestration catalyst; contacting the reactant gas mixture with the at least one catalyst under conditions wherein the reactant gas mixture is at least partly reformed into a product gas mixture including a synthesis gas and solid carbon particles are formed over the at least one two-dimension carbon sequestration catalyst; and recovering the product gas mixture and the solid carbon particles.

The carbon sequestration and dry reforming process can optionally further comprise at least one additional step selected amongst the group of steps comprising: mechanically withdrawing the solid carbon particles, adding steam to the reactant gas mixture, and activating the catalyst by preheating the catalyst under an inert gas flow.

In the carbon sequestration and dry reforming process, the dry reforming of the reactant gas mixture can be first carried on a three dimension catalyst at a first reaction temperature and the sequestering of the carbon can be then carried on the at least one two dimension catalyst at a second reaction temperature. The at least one catalyst can comprise an active metal deposited on one of a non-porous support and/or an iron-based catalytic material located at the surface of, or superficially on, at least one monolith support.

The product gas mixture obtained from the carbon sequestration and dry reforming process can be used in a fuel cell and the reactant gas mixture can be an output product of a fuel cell.

According to another object of the present invention, there is provided a filamentous carbon material resulting from the carbon sequestration and dry reforming process described above.

According to another object of the present invention, there is provided a synthesis gas resulting from the carbon sequestration and dry reforming process described above.

According to another object of the present invention, there is provided a carbon sequestration method in a dry reforming process. The method comprises bringing at least one of a reactant gas mixture including carbon dioxide and an organic material and a dry reformed gas in contact with a two-dimension carbon sequestration catalyst at a temperature wherein a solid carbon deposit is formed at the surface of the two-dimension carbon sequestration catalyst, the two-dimension carbon sequestration catalyst being substantially internal porosity free to reduce-carbon sequestration within the catalyst and increase carbon sequestration superficially on the catalyst.

In the carbon sequestration method, the two-dimension carbon sequestration catalyst can comprise an activated iron-based catalytic material which can include at least one of nickel, chrome and cobalt alloying elements or can be a high temperature resistant iron alloy.

In the carbon sequestration method, the two-dimension carbon sequestration catalyst can comprise an active metal deposited on a non-porous support, the active metal being selected from the group consisting of nickel, platinum group metals promoted nickel, alkali-enhanced nickel, copper-promoted nickel, and tin-promoted nickel. The non-porous support can be a ceramic support selected from the group consisting of alumina, zirconia, and phosphate oxide or a metallic support comprising fritted molybdenum.

According to another object of the present invention, there is provided a carbon sequestration and dry reforming reactor. The reactor comprises at least one housing, each having at least one gas input and at least one gas output, the at least one gas input being adapted to receive a reactant gas mixture composed of an organic material and carbon dioxide; at least one catalyst disposed in at least one of the at least one housing for dry reforming the reactant gas mixture circulating therein into a product gas mixture and sequestering carbon, at least one of the at least one catalyst being a two-dimension carbon sequestration catalyst; and a heater operatively connected to the reactor for heating at least one of the gas mixture and the at least one catalyst.

The reactor can comprise at least two housings, a first of the at least two housings comprising a three dimension dry reforming catalyst for dry reforming the reactant gas mixture and a second of the at least two housings comprising the at least one two dimension carbon sequestration catalyst.

In the reactor, one of the at least one housing can comprise a three dimension dry reforming catalyst for dry reforming the reactant gas mixture and the at least one two dimension carbon sequestration catalyst.

The reactor can be operable in at least one of solid carbon recovery mode and catalyst regeneration mode.

According to a further object of the present invention, there is provided a reforming catalyst. The catalyst comprises an active metal deposited on one of a non-porous support selected from the group consisting of a non-porous metallic support and a non-porous ceramic support, the active metal being selected from the group consisting of nickel, platinum group metals promoted nickel, alkali-enhanced nickel, copper-promoted nickel, and tin-promoted nickel.

The non-porous support can be a ceramic support selected from the group consisting of alumina, zirconia, and phosphate oxide or a metallic support comprising fritted molybdenum.

The reforming catalyst can be a dry reforming catalyst and/or a two dimension catalyst.

The catalyst can be obtained by impregnation of the non-porous support using one of nitrate salts and chloride salts of the active metal or by thermal plasma deposition on the non-porous support using one of nitrates, carbonates, and chlorides of the active metal.

According to another object of the present invention, there is provided a two-dimension reforming catalyst manufacturing process. The process comprises: providing a non-porous support; providing a catalytic metal precursor selected from the group consisting of nickel, platinum group metals promoted nickel, alkali-enhanced nickel, copper-promoted nickel, and tin-promoted nickel; and deposing the catalytic metal precursor over the non-porous support.

In the two-dimension reforming catalyst manufacturing process, the non-porous support can be selected from the group consisting of a non-porous metallic support and a non-porous ceramic support.

The process can further comprise depositing the catalytic metal precursor by thermal plasma deposition using one of nitrates, carbonates, and chlorides of the catalytic metal precursor or depositing the catalytic metal precursor by impregnation of the non-porous support using one of nitrate salts and chloride salts of the metal.

According to another object of the present invention, there is provided a two-dimension catalyst manufacturing process, comprising: providing a non-porous support; providing a catalytic metal precursor selected from the group consisting of nickel, platinum group metals promoted nickel, alkali-enhanced nickel, copper-promoted nickel, and tin-promoted nickel; and deposing a catalytic material over the support by thermal plasma deposition of the catalytic metal precursor.

In the two-dimension catalyst manufacturing process, the catalytic metal precursor can be one of a nitrate, a carbonate, and a chloride. The non-porous support can be selected from the group consisting of a non-porous metallic support and a non-porous ceramic support.

The two-dimension catalyst manufacturing process can further include pressing the deposited catalytic material over the substrate and/or heating the deposited catalytic material under an inert gas flow.

According to another object of the present invention, there is provided a two-dimension carbon sequestration catalyst. The catalyst comprises: an iron-based superficial catalytic material activated by heating under an inert gas atmosphere to a temperature ranging between 700 and 900° C.

According to a general aspect, there is provided a dry reforming process, comprising the steps of: providing a reactant gas mixture comprising carbon dioxide and an organic material; activating a two-dimension carbon sequestration catalyst including a steel-based material by heating the steel-based material to a temperature higher than an eutectic point of the steel-based material to at least partially transform the steel-based material into its α-phase; and bringing said gas mixture in contact with the two-dimension carbon sequestration catalyst comprising the preactivated steel-based catalytically active material at a temperature wherein a solid carbon nanoparticles or nanofilaments are formed at the surface of the two-dimension carbon sequestration catalyst resulting in carbon sequestration; wherein the two-dimension carbon sequestration catalyst is substantially internal porosity free to reduce carbon sequestration within the catalyst and increase carbon sequestration superficially on the catalyst.

According to another general aspect, there is provided a carbon sequestration process comprising the steps of: providing a reactant gas mixture comprising carbon dioxide and an organic material; providing at least one two-dimension carbon sequestration catalyst being substantially internal porosity free for sequestering carbon, said catalyst comprising a steel-based material; activating the steel-based material of the at least one two-dimension carbon sequestration catalyst material by heating the steel-based material to a temperature higher than an eutectic point of the steel-based material to at least partially transform the steel-based material into its α-phase; contacting the reactant gas mixture with the at least one catalyst under conditions wherein solid carbon nanotubes or nanofilaments are formed over the at least one two-dimension carbon sequestration catalyst; and recovering the solid carbon particles.

According to still another general aspect, there is provided a dry reforming process, comprising forming a reactant gas mixture including carbon dioxide, an organic material and a dry reformed gas, the improvement comprising bringing said reactant gas mixture in contact with a two-dimension carbon sequestration catalyst said catalyst comprising a preactivated steel-based catalytically active material at a temperature wherein a solid carbon nanotubes or nanofilaments are formed at the surface of the two-dimension carbon sequestration catalyst resulting in carbon sequestration, the two-dimension carbon sequestration catalyst being substantially internal porosity free to reduce carbon sequestration within the catalyst and increase carbon sequestration superficially on the surface of the catalyst and wherein the steel-based catalytically active material is activated by heating to a temperature higher than an eutectic point of the steel-based material to at least partially transform the steel-based material into its α-phase.

According to a further general aspect, there is provided a dry reforming process, comprising: contacting a reactant gas mixture including carbon dioxide and an organic material with a two-dimension steel based material including α-phase steel and being substantially internal porosity free at a temperature wherein solid carbon nanotubes or nanofilaments including iron are deposited superficially on the steel based material.

BRIEF DESCRIPTION OF THE DRAWINGS

Further features and advantages of the present invention will become apparent from the following detailed description, taken in combination with the appended drawings, in which:

FIG. 12 is a schematic flow sheet of the carbon sequestration and dry reforming process in accordance with an embodiment of the invention, wherein two rows of reactors are operated in parallel.

It will be noted that throughout the appended drawings, like features are identified by like reference numerals.

DETAILED DESCRIPTION OF THE PREFERRED EMBODIMENT

Figure 1:
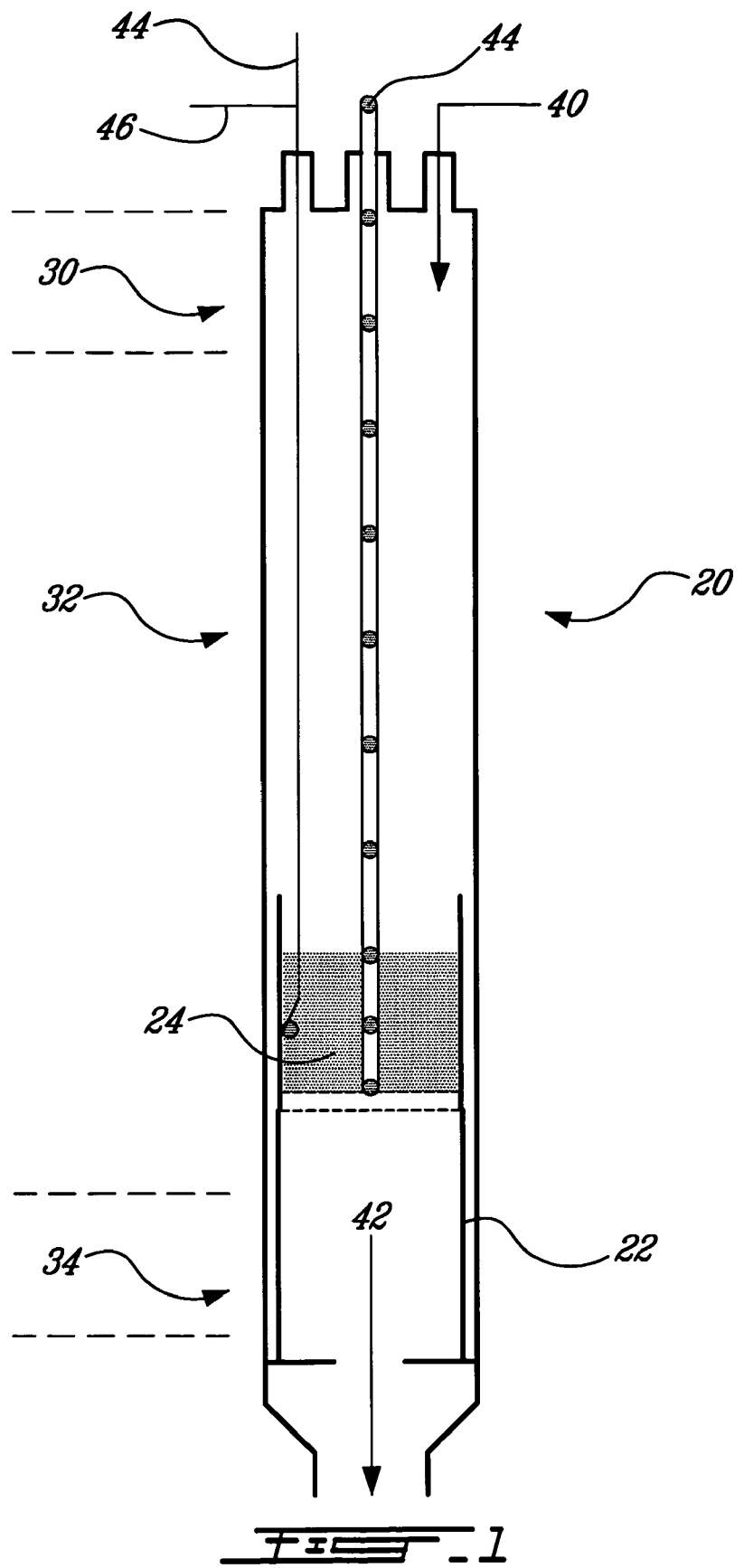
FIG. 1 is a schematic view of a reactor used in a carbon sequestration and dry reforming process in accordance with an embodiment of the invention, wherein the reactor includes one catalytic bed.

The present invention concerns a process that uses dry reforming reactions to sequester an important proportion of the carbon contained in a carbon dioxide molecule ($CO_2$), a greenhouse gas (GHG), while producing simultaneously synthesis gas from renewable resources, like biogas and bio-ethanol. The sequestered carbon forms an inert solid powder that is removed from the process, and simultaneously reducing greenhouse effect gas emissions.

The process aims to the maximization of the carbon deposition during the dry reforming process. Therefore, catalysts maximizing the carbon deposition are necessary. The catalysts used for carbon sequestration are two-dimension (2D) catalyst formulations, i.e. in the case of support catalyst formulations, the active element is located only at the surface of, or superficially on, the support, for maximizing carbon deposition and allowing mechanical recovering of the solid carbon deposited at the surface of the 2D catalyst.

In the carbon sequestration and dry reforming process, a reactant gas mixture, including an organic material in gaseous state and carbon dioxide, enters in contact with one or several catalysts (at least one of the catalysts is a 2D catalyst for carbon sequestration) in predetermined conditions for dry reforming the reactant gas mixture into a product gas mixture and the formation of a solid carbon deposit at the surface of a 2D catalyst. The product gas mixture includes a synthesis gas. The solid carbon deposit and the product gas mixture are recovered for ulterior uses. As will be described in more details below, the carbon sequestration and dry reforming process can be carried out in one or more reactors.

The process can include one or two catalysts for carrying out the dry reforming and the carbon sequestration, at least one being a 2D catalyst for maximizing the carbon sequestration and allowing mechanical retrieval of the sequestered carbon. In one embodiment, only one 2D catalyst is used for both dry reforming and carbon sequestration. In another embodiment, a first three-dimensions (3D) catalyst is used for dry reforming and a second 2D catalyst is used for carbon sequestration. To maximize the carbon sequestration on the second catalyst, it is desirable to minimize the carbon deposition on the first 3D catalyst, as will be described in more details below. The two catalysts can be disposed in the same reactor or in different reactors.

The 2D catalyst for both dry reforming and carbon sequestration can be based on active metals deposited on a non-porous metallic or ceramic support, such as:

a) nickel acting as the main reforming catalytic agent on a non-porous alumina, zirconia or phosphate based support;

b) platinum group metals (i.e. Rh, Ru)-promoted nickel on a non-porous alumina, zirconia or phosphate based support;

c) alkali-enhanced nickel on a non-porous alumina, zirconia or phosphate based support;

d) copper-promoted nickel on a non-porous alumina, zirconia or phosphate based support; and e) tin-promoted nickel on a non-porous alumina, zirconia or phosphate based support.

The active metal can also be deposited on a metallic support such as fritted Mo.

The 2D catalysts are obtained either by impregnation of the non-porous matrices using nitrate or chloride salts of the catalytic metals or by thermal plasma deposition on the non-porous metallic or ceramic support using nitrates, carbonates, chlorides, and the like, as will be described in more details below.

3D catalysts having a similar composition can also be produced for dry reforming and carbon sequestration processes using two catalysts. The dry reforming of the reactant gas mixture occurs with the 3D catalyst while the carbon sequestration occurs on a following 2D catalyst.

The 2D catalysts for carbon sequestration can also be based on iron alloys with a wide concentration range of diverse alloying elements, such as nickel, chrome and cobalt, among others. It can also be high temperature resistant type iron alloys. The iron-based catalysts, such as steel-based, are activated by preheating, as will be described in more details below. The catalysts are under the form of a non-porous monolith allowing the carbon formed to remain at the surface of the catalyst and to be removable from the catalyst by mechanical means, such as air or liquid jets.

For example, the 2D carbon sequestration catalysts can be alloys of Fe/Ni/Cr/Co with a wide range of concentrations of the diverse elements from 100% Fe to high temperature resistant type alloys. The 2D catalysts are activated by preheating in a range from 700 to 900° C. under an inert gas flow.

The purpose of the 2D catalysts is to maximize the sequestration of the carbon associated with the carbon dioxide and to allow a removal of the sequestered carbon by mechanical means. The sequestered carbon is removed, thus contributing to the decrease of GHG emissions.

The sequestered carbon forms an inert solid powder superficially deposited on the catalyst. However, to preserve a catalyst activity as high as possible for as long as possible, the carbon deposited is preferably unloaded, if possible continuously. Therefore, the reactor configuration for the dry reforming process preferably allows the unloading of the solid carbon deposited.

As one skilled in the art will appreciate, the reactor can be a fluidized bed or a fixed-bed reactor. The carbon deposited can be retrieved by mechanical effects such as interparticle friction in fluidized bed reactor or washing fluid spray such as air or liquid jets. Vibrations and gravity can also be applied on the reactor to retrieve the solid carbon deposited. Vibrations release the sequestered carbon from the catalyst matrix.

Figure 2:
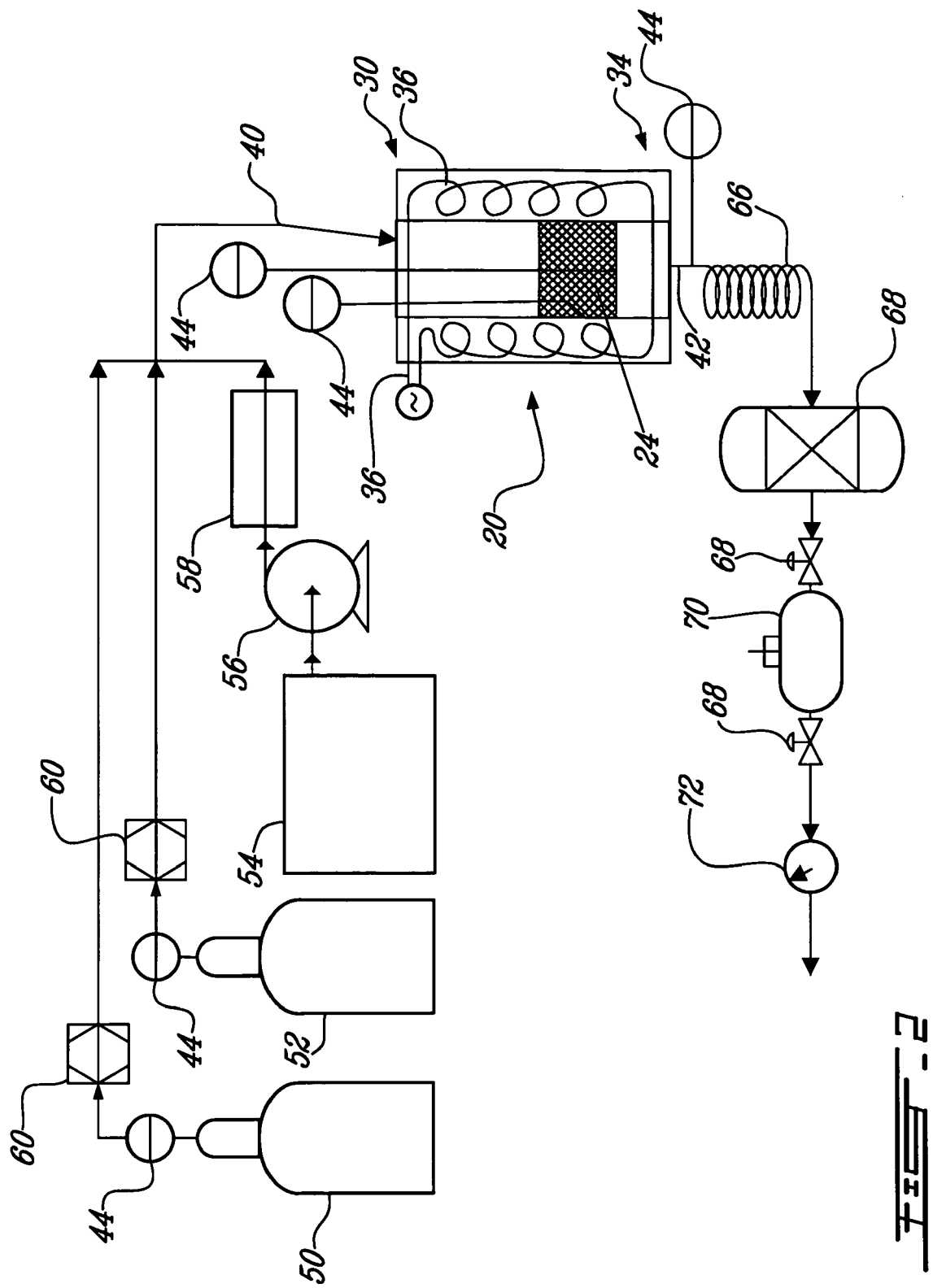
FIG. 2 is a schematic flow sheet of the carbon sequestration and dry reforming process in accordance with an embodiment of the invention, wherein the reactor includes one catalytic bed.

Referring now to FIG. 1, there is shown a fixed-bed reactor 20. The reactor 20 has a catalyst table 22 on which a 2D catalyst 24 is disposed. The reactor 20 is longitudinally divided into three portions: an upper portion 30, a middle portion 32, and a lower portion 34. The upper and lower portions 30, 34 are not heated while the middle portion 32 is provided with heating elements 36 (FIG. 2). A reactant gas mixture 40, being composed of an organic material in gaseous state and carbon dioxide, is introduced in the upper portion 30 of the reactor 20. The organic material preferably includes resources such as hydrocarbons, oxygenated organic molecules, bio-oils, and bio-fuels. Depending on the bio-combustible used, 0 to 10 wt % of water in the form of steam can be added to the reactant gas mixture 40.

Once introduced into the reactor 20, the reactant gas mixture 40 goes down and is heated while going down until the reaction temperature is reached. Thereafter, the reactant gas mixture 40 is in contact with the 2D catalyst 24 where it is reformed into a product gas mixture 42 leaving a carbon deposit (not shown) at the surface of the catalyst 24. The product gas mixture 42 exits at the lower portion 34 of the reactor 20. The composition of the product gas mixture 42 includes carbon monoxide, hydrogen, and water.

In the best conditions, one would expect that for each mole of $CO_2$ being processed, one mole of carbon would be recovered.

For carbon deposit unloading, the 2D catalyst 24 can be washed with a fluid spray (not shown). Frequent unloading, preferably continuous, of the carbon deposit preserves the catalyst activity as high as possible for as long as possible. The 2D catalyst formulations described above enhance the reforming rate while keeping the carbon formed at the surface of the catalyst. It is also possible to use two reactors which are alternatively operated in reforming and carbon recovering modes, as will be described in more details below.

Figure 5:
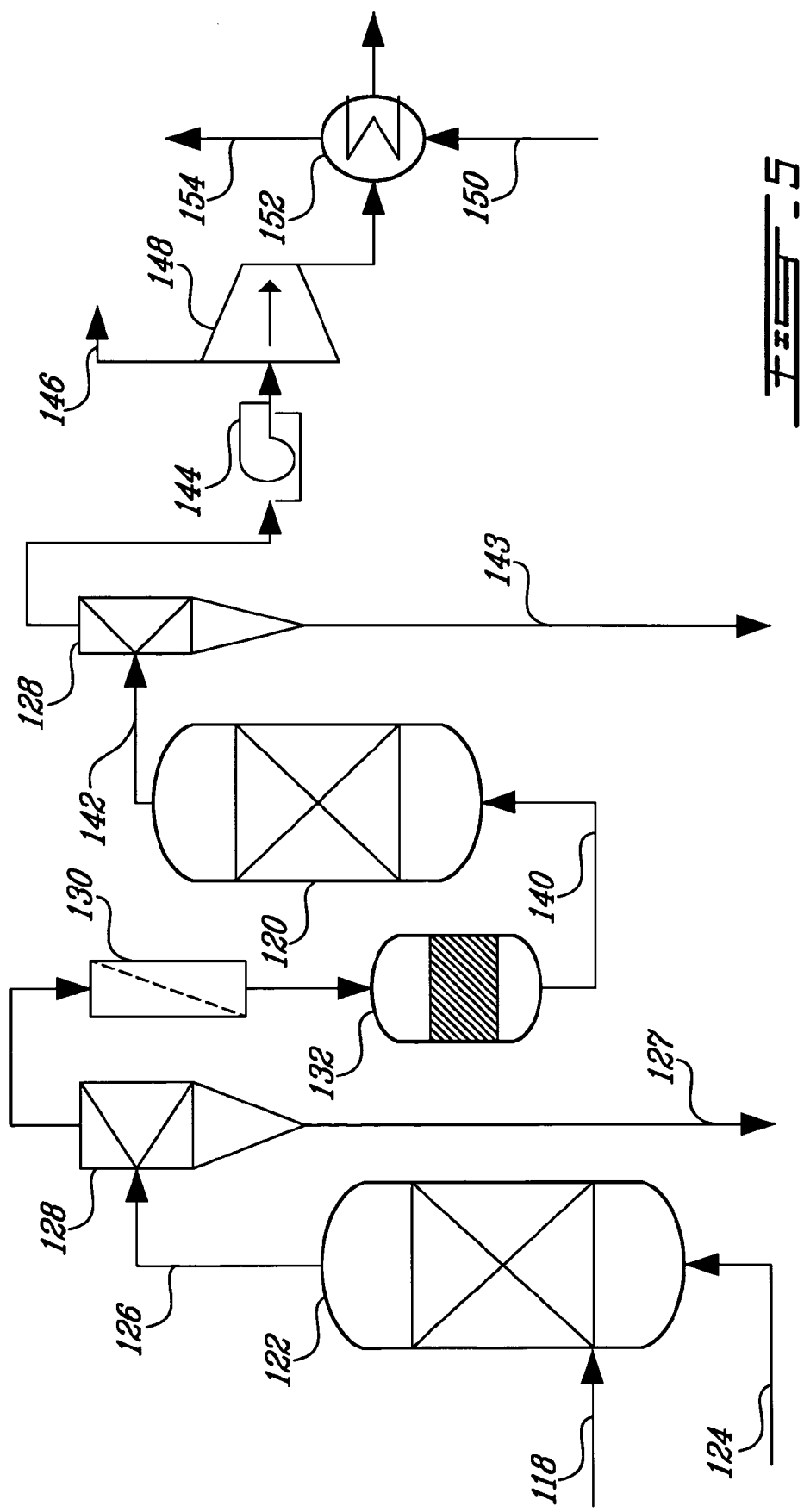
FIG. 5 is a schematic flow sheet of a process for the gasification of waste containing organic material followed by the carbon sequestration and dry reforming process of the gaseous organic material in accordance with an embodiment of the invention.

The dry reforming process can also be carried out in a fluidized bed reactor 120 (FIG. 5). The sequestered carbon is released from the catalyst particles due to the friction between the particles. The carbon released is recovered with the gas. The solid-gas separation can be carried out with a cyclone 128 (FIG. 5) and, if needed, a filter (not shown).

The reactor 20 can also include sensors such as thermocouples 44 and pressure gages 46 to monitor and/or control the process. Temperature sensors 44 insure the homogeneity of the temperature profile inside the catalytic bed. In FIG. 1, a first thermocouple 44 acquires data proximate to a reactor wall and a second thermocouple 44 reads the temperature at several locations along the reactor 20 in the center of the latter. The reaction is usually easier to carry out at low pressures. Therefore, the reactor 20 is typically operated at atmospheric pressure. It is not necessary to control the reactor pressure. One skilled in the art will appreciate that the reactor 20 can contain a plurality of sensors and not only the ones illustrated on FIG. 1.

The molar ratio of organic material and $CO_2$ in the reactant gas mixture 40 typically ranges between 0.3 and 3, preferably between 0.5 and 2. Several factors, such as chemical equilibrium, optimization of reforming, and optimization of carbon sequestration, guide the ratio choice. The optimization of reforming and carbon sequestration depends on the nature of the organic material.

The reaction temperature also depends on the nature of the organic material. The reforming reaction occurs at a reasonable reaction rate when the Gibbs free energy becomes negative. With positive values of the Gibbs free energy ($\Delta G$), the reforming reaction still occurs but the reaction rate is imperceptible. For example, the minimum reaction temperature for methanol is proximate to 200° C. and for methane proximate to 627° C.

As an example, the reduction of carbon dioxide with methane (or dry reforming of methane) is an endothermic reaction ($\Delta H_{800} = +158$ MJ·kmol$^{-1}$).

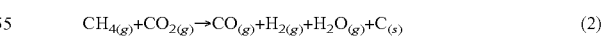

(2)

At a temperature of 800° C., with the dry reforming process, a conversion higher than 98 and 97 mol % for $CH_4$ and $CO_2$ respectively was observed.

The reduction of carbon dioxide with ethanol (or dry reforming of ethanol) is also an endothermic reaction ($\Delta H_{400} = +166$ MJ·kmol$^{-1}$).

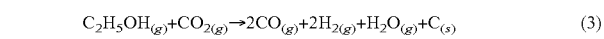

(3)

With the present dry reforming process, at temperatures higher than 400° C., a substantially complete conversion of $C_2H_5OH$ and $CO_2$ is observed.

Example 1

The first example refers to FIG. 2, which is a schematic flow sheet of the carbon sequestration and dry reforming process, at a laboratory scale, wherein either a gaseous or a liquid organic material is dry reformed. The process includes a source of carbon dioxide 50 in gaseous state, a source of an organic material in gaseous state 52, and/or a source of an organic material in liquid state 54. If dry reformed, the organic material in liquid state 54 at ambient temperature is pumped with a pump 56 to a preheater 58. The preheater 58 heats the organic material in liquid state 54 until it volatilizes. Mass flow meters 60 can be positioned on the gas lines to measure on line the reactant masses. The carbon dioxide 50 and at least one of the organic material in gaseous state 52 and the organic material in liquid state 54, now in gaseous state, form the reactant gas mixture 40. The reactant gas mixture 40 enters the upper portion 30 of the reactor 20 and is heated while moving downwardly to reach the reaction temperature. The reactant gas mixture 40 is passed through the 2D catalyst 24 where it is dry reformed into a product gas mixture 42 leaving a carbon deposit (not shown) superficially on the 2D catalyst 24. The product gas mixture 42 exits at the lower portion 34 of the reactor 20 and is cooled down in a cooler 66. The product gas mixture 42, which contains water as a product of the dry reforming reaction, is then dried in a dryer 68. Thereafter, a sample of the product gas mixture 42 can be taken in a sampler 70 to analyze the quality of the product gas mixture 42 obtained by the dry reforming process. The flow of the product gas mixture 42 produced can also be measured with a dry flow meter 72. The dry reforming process can also include several sensors such as thermocouples 44 or pressures gages 46 or analytical tools (not shown).

Example 2

The following example relates to the dry reforming of ethanol in the presence of ruthenium-promoted nickel on an alumina based support catalyst ($NiRu/Al_2O_3$ catalyst). Equation (3) (referred to above) is the dry reforming reaction.

Preparation of the Catalyst

The catalyst was prepared by co-impregnation of the support, which in the example was alumina, with $RuCl_3$ and $Ni(NO_3)_2$, $6H_2O$ precursors. An appropriate amount of the metal salts in an aqueous solution was added to the support (8 grams of $Al_2O_3$, 0.3238 gram of $RuCl_3$, 3.17 grams of $Ni(NO_3)_2$, $6H_2O$). After a stirring maintained during 24 hours, the solid was placed in an oven for 12 hours at 80° C. The catalyst was then calcinated with air at 400° C. for 5 hours with a temperature ramp of 3° C./minute.

Before initiating the experiment, the catalyst was reduced in situ under a hydrogen flow (150 ml/min) during 90 minutes at 400° C. The temperature was increased to the reaction temperature under nitrogen.

Catalytic Test and Results

The dry reforming of ethanol was performed at 500° C. during 90 minutes under a carbon dioxide ($CO_2$) flow of 200 ml per minute and a molar ratio of ethanol to carbon dioxide ($[C_2H_5OH]/[CO_2]$) equal to 0.5. One gram of catalyst was used. Referring to Table 1, it can be seen that the results obtained, after 90 minutes of reaction, in the presence of this catalyst show the formation of hydrogen, carbon monoxide, methane, and other products such as ethylene and ethane.

TABLE 1

|  | $H_2$ | CO | $CO_2$ | $CH_4$ | Other products |
|---|---|---|---|---|---|
| Gas (mol %) | 47.2 | 14.5 | 24.6 | 8.9 | 4.8 |

Referring to Table 2, it can be seen that the yield of carbon and hydrogen formed after 90 minutes of reaction were high. The hydrogen yield was calculated as the ratio of the hydrogen formed during the reaction to the hydrogen introduced as ethanol. The carbon yield was determined by the ratio of the carbon formed to the carbon introduced with $CO_2$. Thus, a unit hydrogen yield means that all hydrogen contained in ethanol is recovered (100 mol % recovery) and a unit carbon yield means that all carbon contained in $CO_2$ is recovered (100 mol % sequestration)

TABLE 2

|  | $H_2$ | C (solid) |
|---|---|---|
| Yield (mol %) | 75 | 52 |

Figure 3:
FIG. 3 is a micrograph of a carbon deposit obtained by the carbon sequestration and dry reforming process.

During this experiment, 5 grams of carbon were obtained with only 1 gram of catalyst. The sequestered carbon was analyzed by electron microscopy to identify its structure. Referring to FIG. 3, it will be seen that carbon whiskers were obtained. The sequestered carbon recovered is a valuable product.

Therefore, the NiRu catalyst supported over alumina leads to hydrogen with a 75 mol % yield and to a carbon sequestration via the formation of carbon whiskers which have an interesting added value.

Example 3

The following example concerns the preparation of a 2D catalyst by the induction plasma technology.

The induction plasma technology has been used widely in the past to process materials. The 'as-sprayed' catalysts are produced using the suspension plasma spraying (SPS) concept (U.S. Pat. No. 5,609,921) applied to catalyst synthesis. Various approaches can be used in order to synthesize the catalyst. For instance Thermal Plasma Chemical Vapor Deposition (TPCVD) can be used by injecting nitrates for instance in the plasma discharge, as described in U.S. Pat. No. 5,032,568. However not every materials can be dissolved and the deposition rate in the vapor phase can be low. Working with saturated solutions such as suspensions can directly give a coating formed through the impingement of liquid droplets which are above the melting point of the catalysts and which can preserve some nanostructure because of the fast quench rate which can be imposed.

Figure 4:
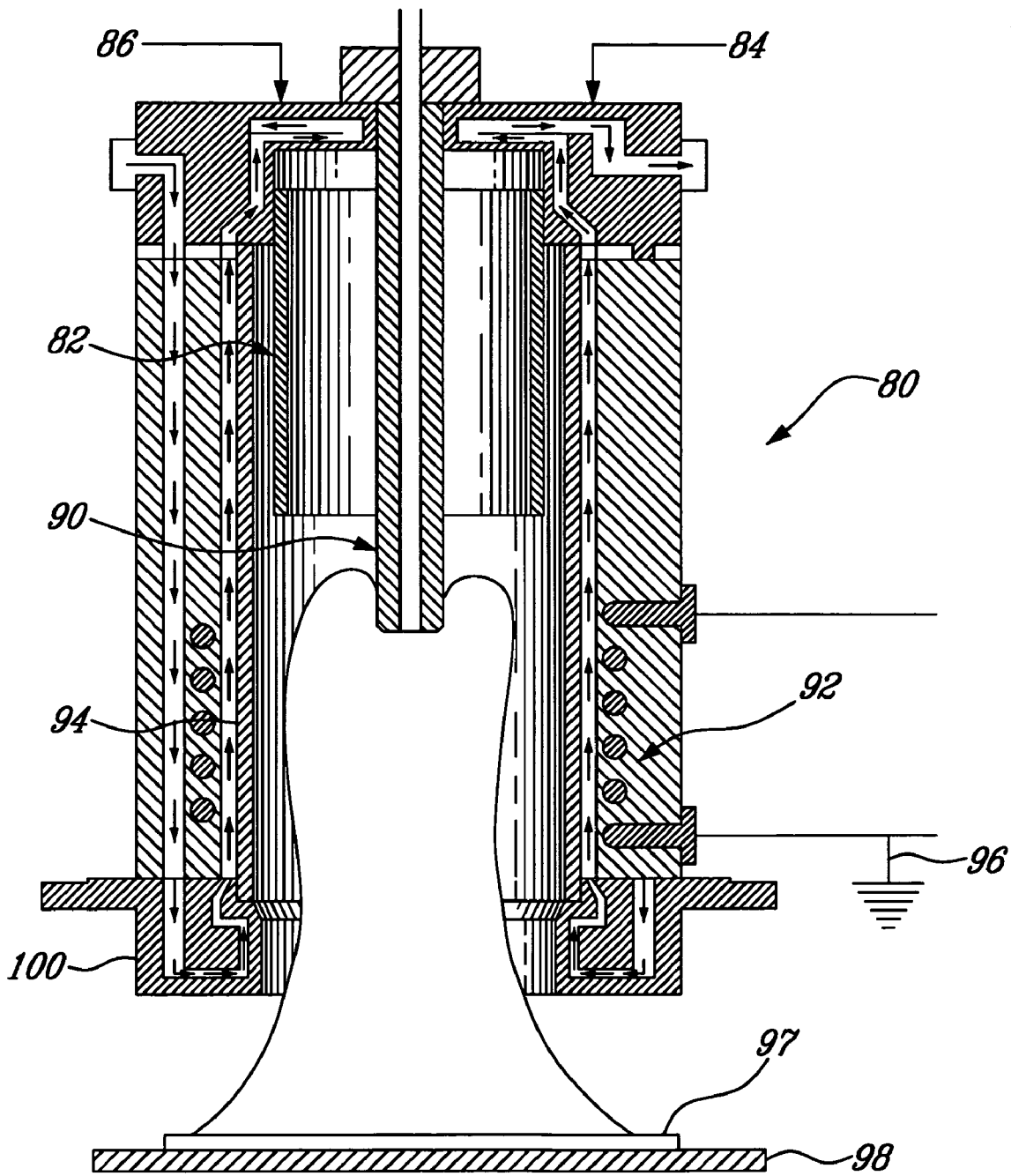
FIG. 4 is a schematic view of an induction plasma torch used to produce a catalyst in accordance with an embodiment of the invention.

TPCVD was performed with an induction plasma torch (model PL50, TEKNA™ Plasma system Inc., Sherbrooke, Quebec, Canada) using a water-cooled ceramic plasma confinement tube, with a 50 mm inner diameter, in which a four-turn induction coil is incorporated. FIG. 4 shows a scheme of the setup given to the induction plasma torch 80. A quartz tube 82 is used to separate a sheath gas 84 from a central gas 86. The central gas 86 is introduced in the center of the torch 80 around a stainless steel injection probe 90, which is water cooled. The probe 90, the tip of which is located at the center of an induction coil 92, penetrates axially through the torch head to inject the solution. The precursors were injected into the Central Injection Probe (CIP) of the torch 80 with a peristaltic pump (not shown) to avoid reactions with the environment; the flow rate was kept constant. The sheath gas 84 is introduced in between the quartz tubes 82 and ceramic tubes 94. The coil 92 is connected to a radio frequency power supply 96 (3 MHZ, model TAFA® 32×50 MC build by Lepel). It also includes a supersonic output nozzle 100 having a convergent-divergent. The plasma torch 80 is used to form a deposit 97 over a substrate 98.

The substrate 98 was pressed during five (5) minutes and the obtained pellets were placed under an argon flow at 900° C. during 12 hours.

The deposited metals precursors were nitrate salts of the metals to be deposited and the solution was prepared by diluting these salts in distilled water at different metal concentrations.

Example 4

The following example relates to mass and energy balances that illustrate the technico-economic relevance of the carbon sequestration and dry reforming process.

Three scenarios were considered: (a) dry reforming of methane, (b) dry reforming of methanol ($CH_3OH$) which is illustrated by the following equation:

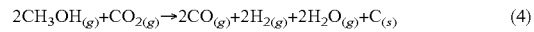
$$2CH_3OH_{(g)} + CO_{2(g)} \rightarrow 2CO_{(g)} + 2H_{2(g)} + 2H_2O_{(g)} + C_{(s)} \quad (4)$$

and (c) waste gasification followed by a dry reforming. Tables 3 to 5 report the mass and energy balance results for the three scenarios. Table 4 contains similar information than Table 3 but all reported per 100 kilograms of fuel.

In all cases the energy efficiency of the combined reforming and carbon sequestration process is higher than 63 mol %. This means that the sequestration costs are approximately one third of the energy content of the fuel.

TABLE 3

|  | $CH_4$ reforming | $CH_3OH$ reforming | Gasification and Reforming |
|---|---|---|---|
| Fuel input (kg) | 2.7 | 6.1 | 14.5 |
| $CO_2$ input (kg) | 7.4 | 3.8 | 5.1 |
| Carbon output (kg) | 2.0 | 1.0 | 1.4 |
| Energy input (MJ) | 149.9 | 124.1 | 261.1 |
| Reforming losses (MJ) | 14.7 | 9.46 | 14.7 |
| Energy output gas (MJ) | 95.8 | 97.2 | 166.4 |
| Energy output C (MJ) | 66.3 | 34.4 | 46.0 |
| Efficiency | 63.9 | 78.3 | 63.7 |
| Energy per kg sequestered C (MJ/kgC) | 7.3 | 9.0 | 10.5 |
| Energy per ton $CO_2$ sequestered (MJ/ton $CO_2$) | 1984 | 2460 | 2854 |
| Cost (\$CDN/ton $CO_2$) | 17.5 | 21.7 | 25.1 |

TABLE 4

|  | $CH_4$ reforming | $CH_3OH$ reforming | Gasification and Reforming |
|---|---|---|---|
| Fuel input (kg) | 100 | 100 | 100 |
| $CO_2$ input (kg) | 275 | 62.5 | 35.5 |
| Sequestered carbon output (kg) | 75.0 | 17.1 | 9.7 |
| Energy input (MJ) | 5565 | 2018 | 1804 |
| Reforming losses (MJ) | 545.7 | 153.9 | 101.4 |
| Energy output gas (MJ) | 3556 | 1580 | 1150 |
| Energy output C (MJ) | 2460 | 559 | 318 |
| Efficiency | 63.9 | 78.3 | 63.7 |
| Energy per kg sequestered C (MJ/kgC) | 7.3 | 9.0 | 10.5 |

TABLE 4-continued

|  | $CH_4$ reforming | $CH_3OH$ reforming | Gasification and Reforming |
|---|---|---|---|
| Energy per ton $CO_2$ sequestered (MJ/ton $CO_2$) | 1984 | 2460 | 2854 |
| Cost (\$CDN/ton $CO_2$) | 17.5 | 21.7 | 25.1 |

TABLE 5

| 1. For electrical energy production | |
|---|---|
| Carbon HHV | 33 MJ/kg |
| Equivalent energy in kWh electric (combined cycle) | 4.6 kWh |
| Cost of electricity production | 0.04 US\$/kWh |
| Break-even price of sequestered carbon | 0.183 US\$/kg C |
| 2. For steam production | |
| Carbon HHV | 33 MJ/kg |
| Cost of equivalent steam | 0.004 \$/MJ |
| Break-even price of sequestered carbon | 0.132 \$/kg C |

A promising application of the carbon sequestration and dry reforming process is shown schematically in FIG. 5 which describes the application of the carbon sequestration and dry reforming process in a waste gasification industrial unit.

The waste gasification is a process that chemically and physically changes biomass 118. Gasification uses heat, pressure, and steam to convert biomass 118 such as coal, petroleum-based materials, and organic materials. The biomass 118 is prepared and fed, in either a dry or slurried form, into a sealed reactor chamber called a gasifier 122. The feedstock is subjected to high heat, atmospheric or higher than atmospheric pressure, and either an oxygen-rich or air environment within the gasifier. Oxygen-enriched air or air 124 can be added to the gasifier 122. In all cases the amount of the oxygen used is typically lower than 40% of the stoichiometric quantity. The end products 126 of gasification includes hydrocarbon gases, mainly syngas, but also other hydrocarbons, and char (carbon black and ash). Solid residues 127 of the end products 126 are removed in a cyclone 128 and a filter 130. The end products 126 can be subsequently purified in a purifier 132 to remove fine particles, tar and contaminants in small quantities, such as HCl, $SO_x$, HCN, $NH_3$ and the like, and obtain a reactant gas mixture 140.

The reactant gas mixture 140 is then injected in a reactor 120, which in the present example is a fluidized bed, wherein the hydrocarbon gas are dried reformed, leaving a carbon deposit on the 2D catalyst. The product gas mixture 142 obtained after the carbon sequestration and dry reforming process includes a higher proportion of syngas than the reactant gas mixture 140 and less carbon dioxide. The sequestered carbon is released from the catalyst particles due to the friction between the particles in the fluidized bed. The carbon released 143 is recovered with the gas. A solid-gas separation can be carried out with a cyclone 128. Syngas is used as an energy vector. It can be burned in a burner 144 as a fuel source and generate electricity 146 with a gas turbine 148 and used to boil water 150 in a boiler 152 to generate steam 154. It can be also used directly in solid oxide fuel cells, as will be illustrated below, or in other fuel cells after a step of hydrogen purification.

Example 5

The following example relates to the dry reforming of methane in the presence of two catalysts: a 3D low porosity zirconia/alumina supported Ni catalyst (Ni/ZrO$_2$—Al$_2$O$_3$ composite catalyst) for dry reforming of methane followed by a 2D thermally activated carbon steel catalyst for carbon sequestration. The following equations are the dry reforming reaction, the Boudouard reaction and the CO reduction by H$_2$:

$$CH_{4(g)} + CO_{2(g)} \Leftrightarrow 2CO_{(g)} + 2H_{2(g)} \quad (5)$$

$$CO_{(g)} \Leftrightarrow \tfrac{1}{2}CO_{2(g)} + \tfrac{1}{2}C_{(s)} \quad (6)$$

$$H_{2(g)} + CO_{(g)} \Leftrightarrow H_2O_{(g)} + C_{(s)} \quad (7)$$

Preparation of the Catalysts

For the preparation of the Ni/ZrO$_2$—Al$_2$O$_3$ composite catalyst the first step was the preparation of the zirconia/alumina support. Al$_2$O$_3$ powder having a particle size of approximately 10 nanometers was mixed with the powder of 7% YO$_2$- stabilized ZrO$_2$ having a particle size less than approximately 20 μm. For the preparation of a typical cylindrical pellet, three hundred milligrams of each powder were mixed and pressed at 2670 atm (40 000 psi or 276 MPa) for 5 minutes. The pellet was then heated at 1 400° C. for 16 hours at a heating rate of 5° C. per minute to solidify the pellet and reduce its porosity.

The second step was the deposition of nickel at the surface of the pellet by impregnation. A pre-calculated amount of the metal precursor Ni(NO$_3$)$_2$, 6H$_2$O was used to prepare an aqueous impregnation solution with the following amounts of materials: 10 g of Ni(NO$_3$)$_2$, 6H$_2$O, 5 grams of H$_2$O, 0.3 gram of Al$_2$O$_3$ and 0.3 gram ZrO$_2$. The solution was stirred during 24 hours and a solid was removed from the saturated solution and dried. The solid was then calined with air at 500° C. for six (6) hours with a temperature ramp rate of 5° C. per minute to obtain the 3D composite catalyst.

Before its use, the 3D catalyst was reduced in situ under a pure hydrogen flow during 60 minutes at 500° C. Then the temperature was increased up to the reaction temperature under pure nitrogen flow.

The composite catalyst obtained was a 3D catalyst for dry reforming of methane with a minimum sequestration of carbon.

The second catalyst were steel shavings that were used as 2D catalysts to perform the Boudouard and CO reduction reactions (reactions 6 and 7) in the second part of the reactor or in a second reactor. The carbon steel catalysts were activated at 830° C. under a nitrogen atmosphere for one hour. The eutectic temperature of the steel is at 723° C. and the objective was to transform all the steel in its alpha phase.

Heating the catalysts under a nitrogen flow prior to beginning the carbon sequestration and dry reforming process prevents the oxidation of the reactive surfaces of the catalysts and the formation of undesirable carbon that would occurred if the reactor was fed with the reactant gas mixture during the catalyst heating phase.

Experimental Setup

Figure 6:
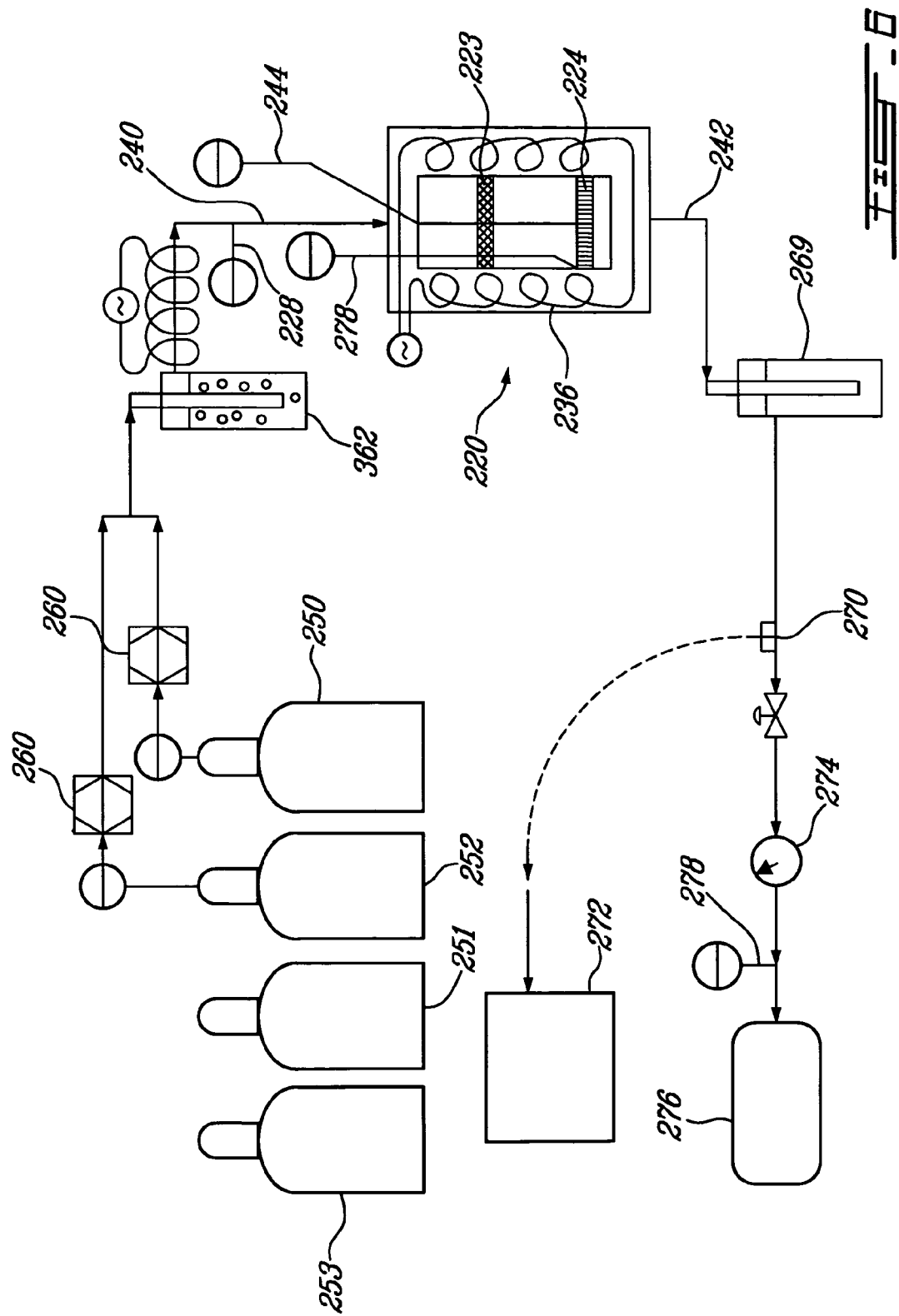
FIG. 6 is a schematic flow sheet of the carbon sequestration and dry reforming process in accordance with an embodiment of the invention, wherein the reactor includes two catalytic beds.
Figure 7:
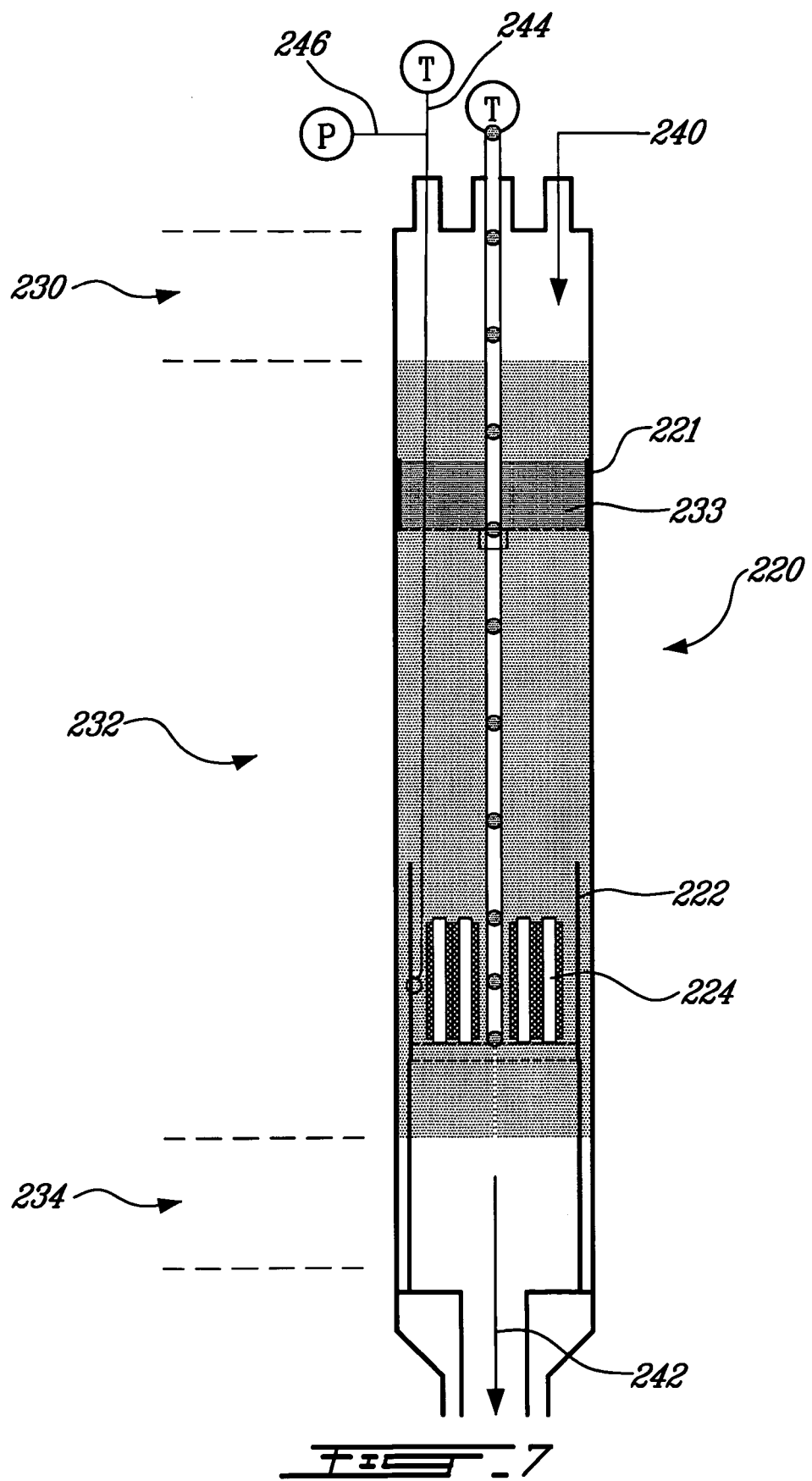
FIG. 7 is a schematic view of a reactor used in the carbon sequestration and dry reforming process in accordance with an embodiment of the invention, wherein the reactor includes two catalytic beds.
Figure 8A:
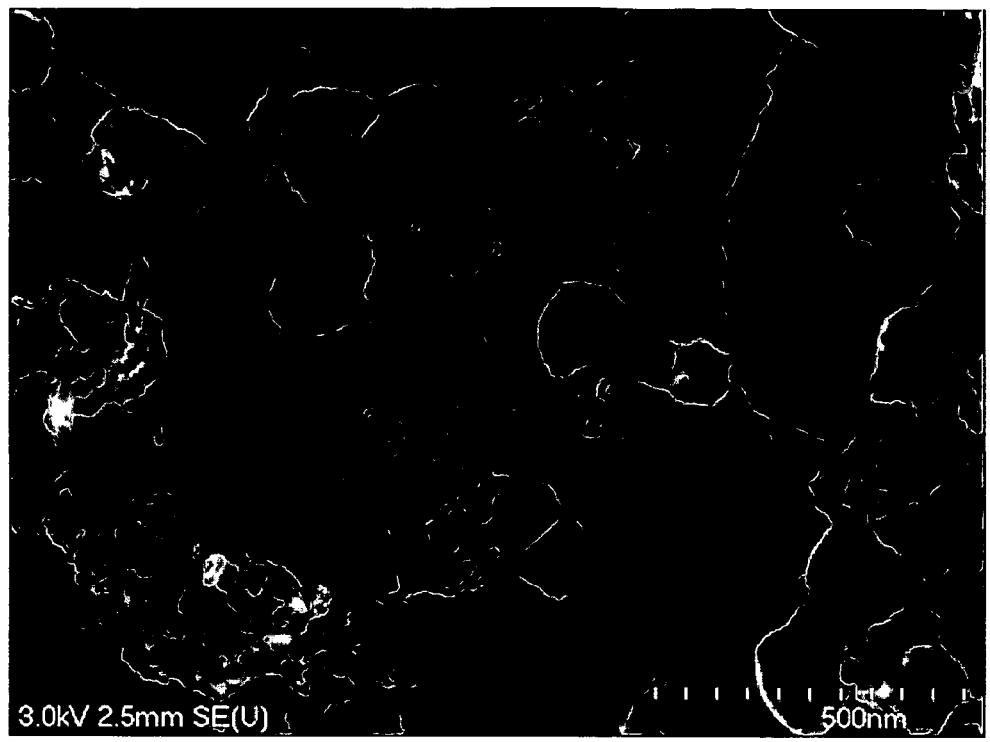
FIG. 8 includes FIGS. 8a, 8b, 8c, and 8d and are micrographs of carbon whiskers formed in the presence of two catalysts (Ni/Al2O3-ZrO2 and thermally activated carbon steel) taken respectively at 500 nm, 1000 nm, 100 nm, and 1 μm.
Figure 8B:
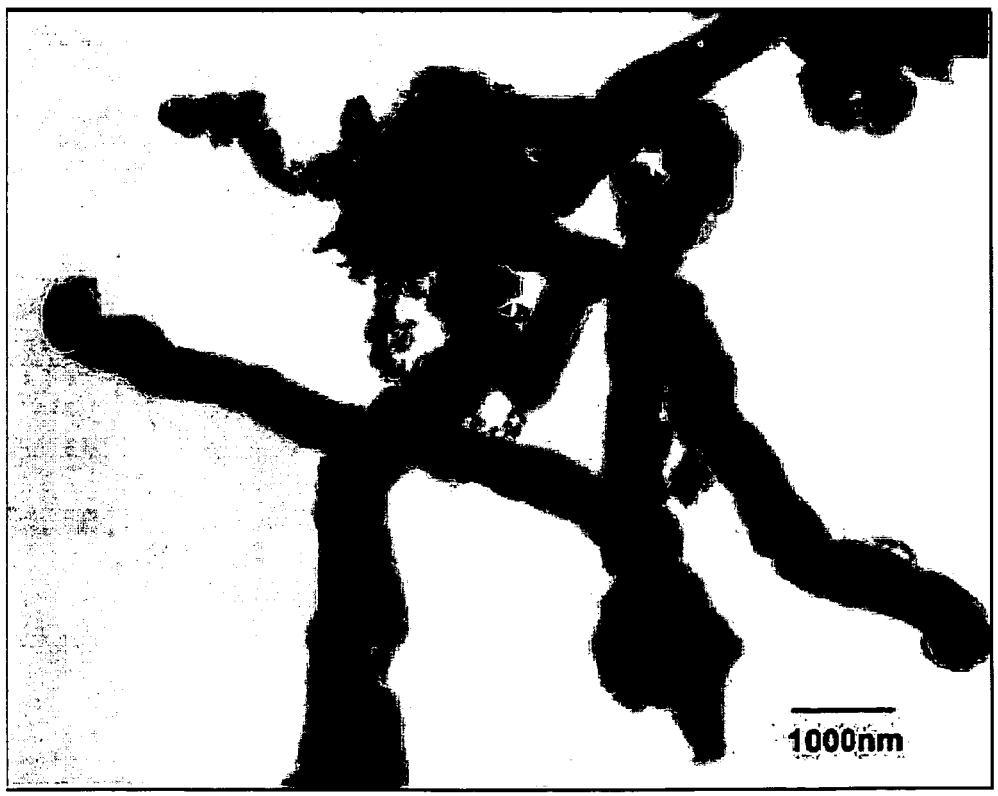
Figure 8C:
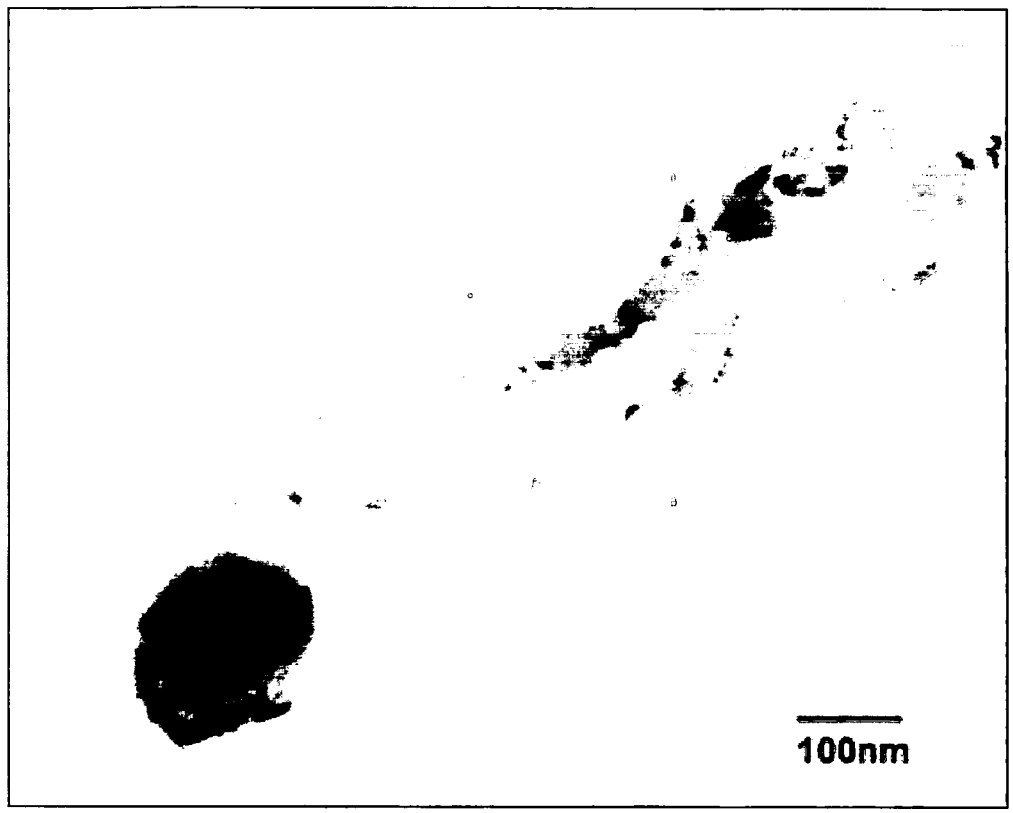
Figure 8D:

Referring to FIGS. 6 and 7, it will be seen that the experimental setup started with four gas cylinders 250, 251, 252, and 253. The first gas cylinders 250 contained CO$_2$, the second gas cylinder 251 contained hydrogen, the third gas cylinder 252 contained methane, and the fourth gas cylinder 253 contained nitrogen. Hydrogen was used to reduce the 3D composite catalyst as described above. Nitrogen was used to avoid the oxidation of the catalysts. Two rotameters 260 were used to measure the gas flow. The gas chromatograph 272 (GC) was used to obtain a higher precision of the molar ratio of methane to carbon dioxide ([CH$_4$]/[CO$_2$]). The reactant gas mixture 240 passed through a heat controlled stirrer 262 for humidification of the gas to its saturation. Saturation was obtained with a decrease of the gas temperature that followed the stirrer 262. A thermocouple 244 measured the gas temperature before it enters into the reactor 220. At this point, the reactant gas mixture 240 was supposed to be fully mixed.

The reactor 220 included an upper catalyst table 221 and a lower catalyst table 222, each having a catalyst fixed bed disposed thereto. The upper catalyst table 221 contained the reformer catalyst (Ni/ZrO$_2$—Al$_2$O$_3$ composite catalyst) fixed bed 223 and the lower table 222 contained the carbon deposition catalyst (steel shavings) fixed bed 224.

The reactor 220 was longitudinally divided into three portions: an upper portion 230, a middle portion 232, and a lower portion 234. The upper and lower portions 230, 234 were not heated while the middle portion 232 was provided with three independent controlled heating elements 236 (only one is shown). These three heating elements 236 allowed an optimization of the temperature for both reactions and allowed rapid temperature changes. A thermocouple 244, which takes the temperature at ten (10) points along the reactor, was disposed in the center of the reactor 220. The thermocouple 224 allowed an accurate monitoring of the temperature profile in the reactor and control of the latter to follow a predetermined temperature profile by actuating the heating elements 236.

The product gas mixture 242 withdrawn from the reactor 220 was allowed sufficient time to cool down before being dried (for the GC test) with a molecular sieve (3 Å) 269. Following the molecular sieve 269, a septum 270 was used for sampling the product gas mixture 242 for GC analyses. The remaining product gas mixture 242 was measured with a volume flow meter 274 and accumulated in a collector bag 276.

As for the experimental set-up shown in FIGS. 1 and 2, one skilled in the art will appreciate that the experimental set-up can contain a plurality of sensors 278 such as thermocouples and pressure gages.

The whole experimental setup was built with stainless steel 316 except the stirrer 262 and the molecular sieve jar which were built in glass.

Once introduced into the reactor 220, the reactant gas mixture 240 went down and was heated while going down until the first reaction temperature was reached. Thereafter, the reactant gas mixture 240 was passed through the 3D catalyst fixed bed 223 where it was reformed. Then, the reformed gas mixture went down, reached the second reaction temperature, and was passed through the 2D catalyst fixed bed 224 leaving a carbon deposit (not shown) superficially on the 2D catalyst. The product gas mixture 242 exited at the lower portion 234 of the reactor 220. The product gas mixture 242 was mainly composed of carbon monoxide, hydrogen, and water.

Catalytic Test and Results

The dry reforming of methane was performed at 730° C. during 150 minutes with a carbon dioxide (CO$_2$) flow of 16.5 ml/minute and 1.2 ml/minute of steam. The molar ratio of methane to carbon dioxide and steam ([CH$_4$]/[CO$_2$]/[H$_2$O]) in the reactant gas mixture 240 was equal to 45/55/4. 0.6 gram of the 3D Ni/ZrO$_2$, Al$_2$O$_3$ catalyst and 10 grams of 2D steel catalyst were used. In the same reactor, the Boudouard and CO reduction reactions took place at a temperature of 500° C. No sample was taken between the reforming reaction and the carbon deposition reactions. Table 6 shows the composition of the product gas mixture 242 after 150 minutes of reaction.

TABLE 6

|  | $H_2$ | CO | $CH_4$ | $CO_2$ |
|---|---|---|---|---|
| Gas (mol %) | 42.4 | 16.2 | 12.2 | 29.2 |

Table 7 shows the yield of hydrogen, carbon and carbon monoxide formed during the reaction and the conversion of methane and $CO_2$. The hydrogen yield was calculated as the ratio of hydrogen (in moles) measured in the product gas mixture 242 to the hydrogen introduced with the reactant gas mixture 240 as methane and water. The carbon yield was determined by the ratio of carbon (in moles) formed in the reactor 220 to the carbon introduced as $CO_2$ in the reactant gas mixture 240. Thus a unit hydrogen yield means that all hydrogen contained in the $CH_4$ and water was recovered as $H_2$ (100 mol % recovery) and a unit carbon yield means that all carbon in $CO_2$ is recovered as solid carbon (100% molar sequestration). The yield of carbon monoxide (CO) is defined as the ratio of the CO (in moles) measured in the product gas mixture 242 to the $CH_4$ (in moles) in the reactant gas mixture 240. The carbon yield (C) is calculated as the percentage of the converted $CO_2$ which ended-up as solid carbon. The percentage of conversion for $CH_4$ is:

$$\left(1 - \frac{CH_4 \text{ in the product gas mixture}}{CH_4 \text{ in the reactant gas mixture}}\right) * 100.$$

The percentage of $CO_2$ conversion is calculated in the same manner.

TABLE 7

|  | $CH_4$ | $CO_2$ | $H_2$ | CO | C |
|---|---|---|---|---|---|
| Conversion or Yield (mol %) | 75.4 | 44.2 | 49.6 | 43.4 | 68.7 |

0.834 gram of carbon were obtained with 0.6 gram of reforming catalyst and a surface of less than one square meter of carbon formation catalyst. The sequestered carbon was analyzed by electron microscopy to identify its structure. FIGS. 8a, 8b, 8c, and 8d show the presence of a mixture of carbon whiskers and other similar filamentous structures.

Figure 9:
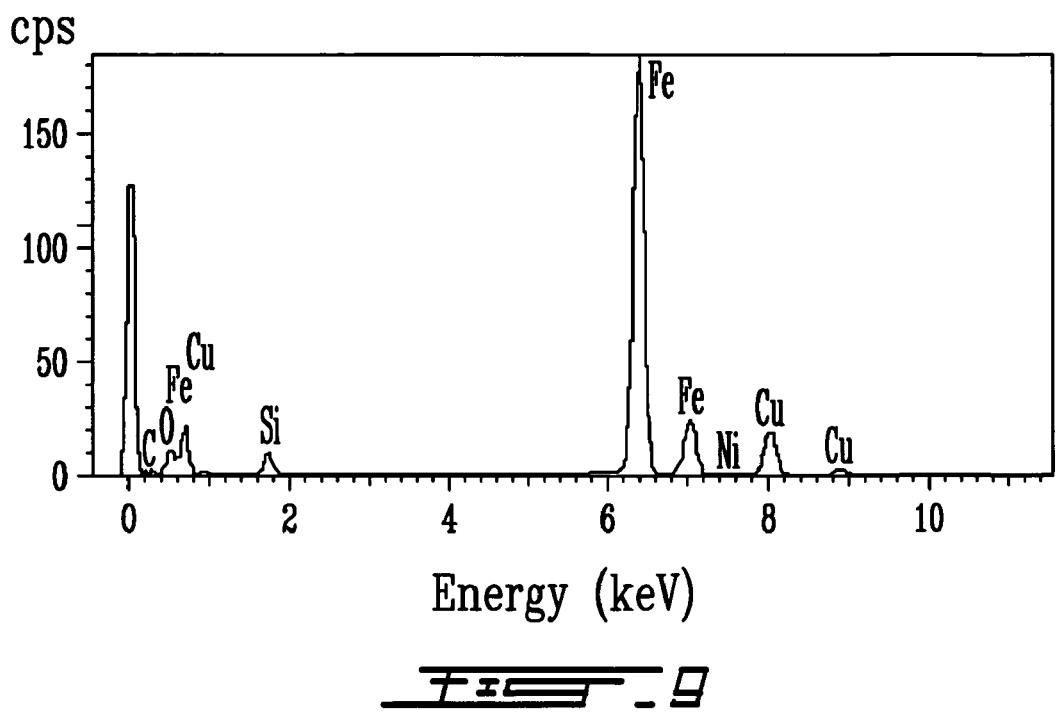
FIG. 9 is an elementary analysis of a sequestered carbon particle on a two dimension activated carbon steel catalyst during the carbon sequestration and dry reforming process.

Referring to FIG. 9, it will be seen that elementary analysis showed the presence of iron in the carbon sample. With a transmission electronic microscope, the iron was found in a particle form included in the filament. The other elements, i.e. silicon and copper, were part of the sample support. The particle was substantially nickel free.

Example 6

Mass balances were realized on three experiments with data obtained from the GC 272 and volume flow meter 274. The ratio of $CH_4$ and $CO_2$ was determined with the GC as the product gas mixture concentration. The volume flow meter 274 measured the volume of the product gas mixture 242 for the entire experiment. The reactant gas mixture flow was estimated with the two rotameters 260 and was corrected with the data provided by the GC 272 and the volume flow meter 274. The steam saturated the reactant gas mixture 240. The volume of the reactant gas mixture 240 was evaluated at the coldest temperature reached (considering a saturated gas: if its temperature decreases, the steam condensates and the liquid water drips). The mass balance was satisfactory when the closure was higher than 95% for the overall, the carbon, and the oxygen mass balances. The hydrogen mass balance usually does not have the satisfactory precision for hydrogen concentrations higher than 35% due to the GC sensitivity.

Tables 8 and 9 show the results of a first experiment that was carried out with a catalyst. A non porous 2D catalyst obtained by impregnation of nickel on a zirconia-alumina matrix was used for both carbon sequestration and dry reforming. The reforming was carried out at 730° C. and the Boudouard reaction was carried out at 500° C. The reactant gas mixture ratio ($[CH_4]/[CO_2]/[H_2O]$) was 0.82/1/0.08.

The test was carried out during 150 minutes. The gas reactant mixture content and flow is shown in Table 8.

Table 9 shows the mass balance results with the percentage of conversion of the different components. In Table 9, the conversion from volume to mole was done with the perfect gas equation at atmospheric pressure and 25° C.

TABLE 8

| Duration | 150 minutes |
|---|---|
| Inputs |  |
| Gas flow | 29.5 |
| $CH_4$ | 13.3 ml/min |
| $CO_2$ | 16.2 ml/min |
| Outputs |  |
| Start | 1273.8 |
| End | 1278.4 |
| Volume | 4.56 L |
| Total | 4.85 L |
| Water | 0.86 gram |
| Carbon | 0.83 gram |

TABLE 9

| Species Unit | Input Volume liter | Moles | Mass gram | Output Volume liter | Moles | Mass gram | Conversion Yield (%) |
|---|---|---|---|---|---|---|---|
| $CO_2$ | 2.43 | 0.10 | 4.38 | 1.38 | 0.06 | 2.48 | 43.3 |
| $CH_4$ | 1.99 | 0.08 | 1.30 | 0.50 | 0.02 | 0.33 | 75.0 |
| CO | 0 | 0 | 0 | 0.88 | 0.04 | 1.00 | 19.9 |
| $H_2$ | 0 | 0 | 0 | 2.10 | 0.09 | 0.17 | 50.5 |
| $H_2O$ | — | 0.01 | 0.13 | — | 0.05 | 0.86 | 47.8 |
| Carbon | — | 0 | 0 | — | 0.07 | 0.83 | 69.9 |
| C | — | 0.18 | 2.17 | — | 0.18 | 2.19 | 0.7 |
| O | — | 0.21 | 3.30 | — | 0.20 | 3.14 | −4.8 |
| H | — | 0.34 | 0.34 | — | 0.35 | 0.35 | 2.4 |
| Total |  |  | 5.81 |  |  | 5.67 | −2.3 |

Tables 10 and 11 show the results obtained in a second test performed in similar conditions. A low porosity catalyst obtained by impregnation of nickel on a zirconia-alumina matrix was used for both carbon sequestration and dry reforming. The reforming and the Boudouard reaction were carried out at 730° C. The reactant gas mixture ratio ($[CH_4]/[CO_2]/[H_2O]$) was 1/1/0.08.

The test was carried out during 126 minutes. The gas reactant mixture content and flow is shown in Table 10.

TABLE 10

The mass balance for the reforming test

| | |
|---|---|
| Duration | 126 minutes |
| Inputs | |
| Gas flow | 30.6 |
| $CH_4$ | 15.2 ml/min |
| $CO_2$ | 15.4 ml/min |
| Outputs | |
| Start | 1285.4 |
| End | 1289.5 |
| Volume | 4.07 L |
| Total | 4.32 L |
| Water | 0.75 gram |
| Carbon | 0.65 gram |

TABLE 11

| | Input | | | Output | | | Conversion Yield (%) |
|---|---|---|---|---|---|---|---|
| Species Unit | Volume liter | Moles | Mass gram | Volume liter | Moles | Mass gram | |
| $CO_2$ | 1.94 | 0.08 | 3.49 | 1.06 | 0.04 | 1.91 | 0.45 |
| $CH_4$ | 1.92 | 0.08 | 1.25 | 0.59 | 0.02 | 0.39 | 0.69 |
| CO | 0.00 | 0.00 | 0.00 | 0.88 | 0.04 | 1.01 | 0.23 |
| $H_2$ | 0.00 | 0.00 | 0.00 | 1.78 | 0.07 | 0.15 | 0.45 |
| $H_2O$ | — | 0.01 | 0.11 | — | 0.04 | 0.75 | 0.53 |
| Carbon C | — | 0.00 | 0.00 | — | 0.05 | 0.65 | 0.68 |
| O | — | 0.16 | 1.89 | — | 0.16 | 1.89 | 0.00 |
| H | — | 0.16 | 2.63 | — | 0.16 | 2.63 | 0.00 |
| Total | — | 0.33 | 0.33 | — | 0.33 | 0.33 | 0.00 |

Figure 10:
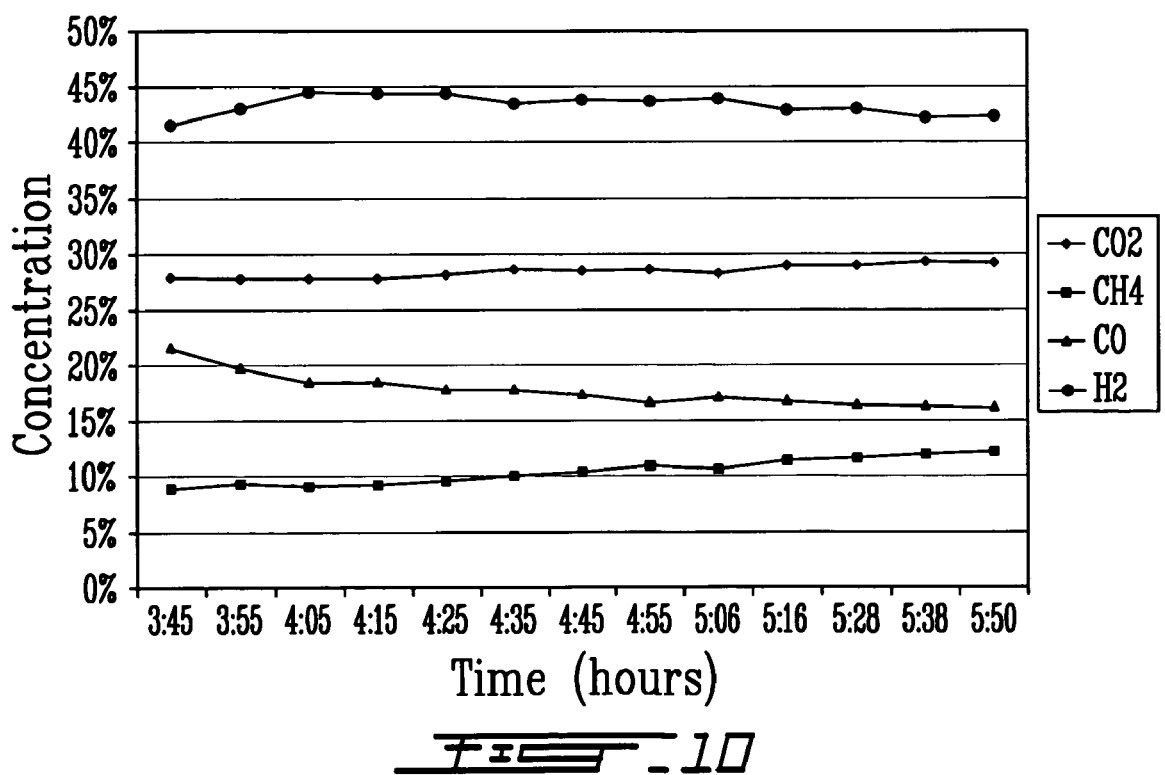
FIG. 10 is a graph representing the evolution of the product gas mixture as a function of the time with the reactant gas mixture having ratios of 0.82 mol of methane per mol of $CO_2$ and 0.08 mol of $H_2O$ per mol of $CO_2$.
Figure 11:
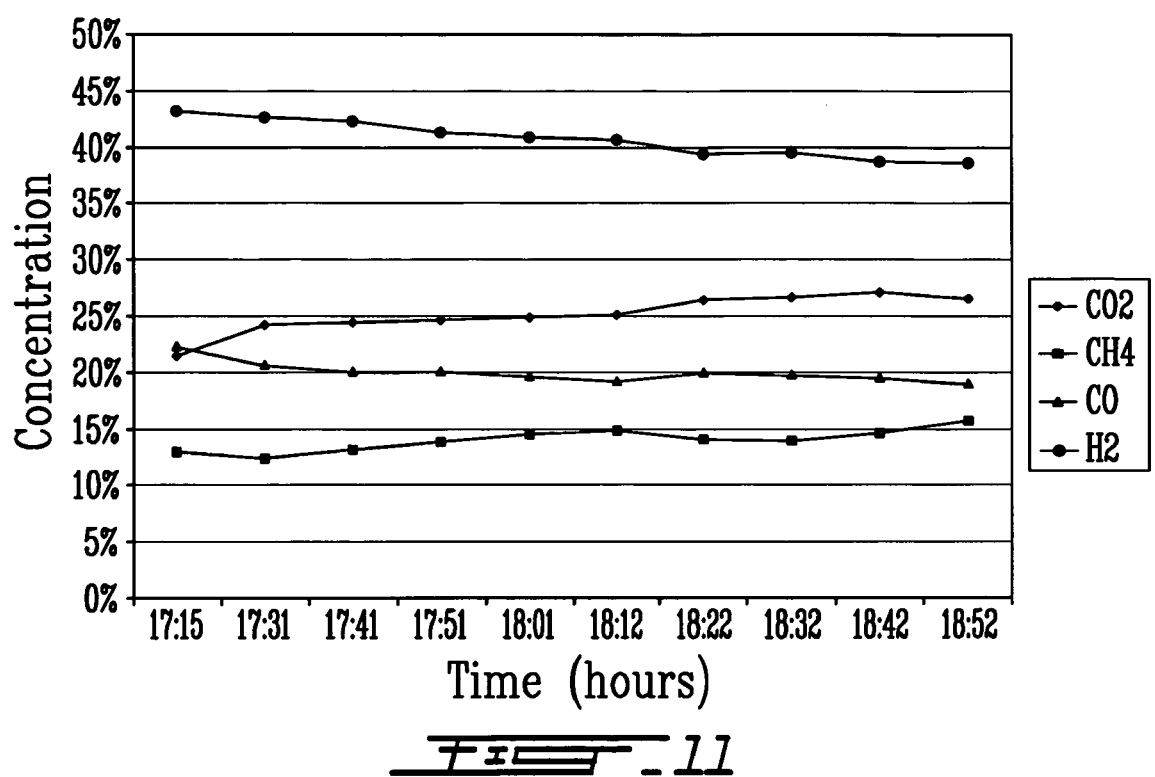
FIG. 11 is a graph representing the evolution of the product gas mixture as a function of the time with the reactant gas mixture having ratios of one mol of methane per mol of $CO_2$ and 0.08 mol of $H_2O$ per mol of $CO_2$.
Figure 17:
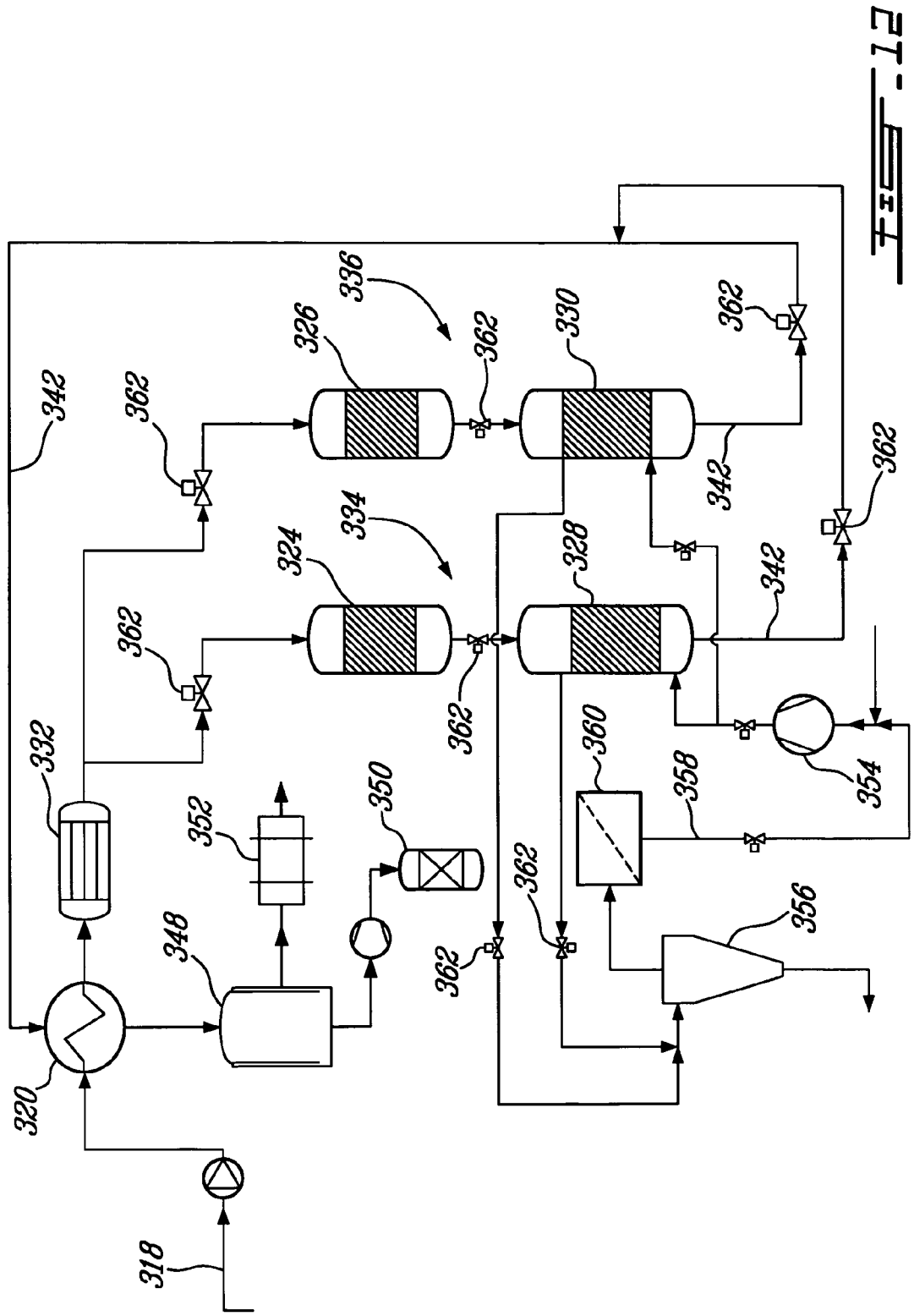

FIGS. 10 and 11 show the time evolution of the gas concentration respectively for the first and the second experimentations described above. FIG. 10 relates to the test results shown in Tables 8 and 9 and FIG. 11 relates to the test results shown in Table 10 and 11. The increase of the methane and $CO_2$ concentrations and the decrease of the $H_2$ and CO concentration over time can be seen as a reforming catalyst deactivation. An increase of the Boudouard reaction over time was observed, creating an increase of the CO consumption and the $CO_2$ production.

The nucleation of the filaments is a more difficult process than the growth of the filaments. Therefore, at the beginning of the experimentations, no filament was formed and, consequently, the CO consumption was low. At the end of the experimentations, several filaments were growing simultaneously and the CO consumption was higher than at the beginning of the experimentation. Moreover, the temperature was not optimized in these experimentations and a portion of the carbon was transformed in methane by the hydrogen contained in the product gas mixture 242.

Example 7

Referring now to FIG. 12, it will be seen another embodiment of the dry reforming process adapted for an industrial process.

A biogas source 318 (e.g. a landfill gas), containing an organic material and carbon dioxide in gaseous phase, is provided. The biogas 318 is first heated in a first heat exchanger 320 by recovering heat contained in the product gas mixture 342 produced by the reactors 324, 326, 328, and 330, as will be described in more details below. The biogas 318, exiting from the first heat exchanger 320, can be further heated in a second heat exchanger 322. The heated biogas 318, or the reactant gas mixture, then flows to one of the two parallel reactor lines 334, 336. One skilled in the art will appreciate that any number of parallel reactor lines 334, 336 can be provided. Each reactor line 334, 336 includes two reactors 324, 326, 328, and 330, which can be either fixed or fluidized bed reactors, in series. One skilled in the art will appreciate that the reactor line 324, 326 can include only one reactor which performs both dry reforming and carbon sequestration operations.

On FIG. 12, the first reactor 324, 326 of a reactor line 334, 336 includes a 3D reforming catalyst while the second reactor 328, 330 of a reactor line 334, 336, following the first reactor 324, 326, includes a 2D carbon sequestration catalyst.

The reactor lines 334, 336 are operated in an alternative mode for providing a continuous carbon sequestration and dry reforming of the biogas 318: one reactor line is operated in catalyst regeneration mode and the other line is operating in carbon sequestration and gas reforming mode, thus insuring uninterrupted continuous operation. The catalyst regeneration can be carried out with any appropriate technique known to one skilled in the art.

The product gas mixture 342 resulting from the reactor line operating in carbon sequestration and gas reforming mode is recovered and sent to the first heat exchanger 320 for preheating the biogas 318. Once cooled down, the product gas mixture can be sent to a tank 348 for being transferred to a catalytic synthesis reactor for liquid fuels 350, a power generator 352, or any other desired apparatus.

The air stream generated by a blower 354 is used to remove mechanically the multiwall nanotubes (MWNT) sequestered on the 2D catalyst. The MWNT removed by the air stream are sent through a cyclone 356 or other gas/solid separators, such as an electrostatic precipitator, to retain all MWNTs with an average size higher than 10 μm, for example. The air stream 358 leaving the cyclone 356 carries all particles with an average size lower than 10 μm, for example, and is sent through a baghouse 360, or other type of cold gas filters, to retain all remaining MWNTs. The air stream 358, thus scrubbed out from solids is released or brought back in a closed-loop including the blower 354 to the catalyst unloading process described above. As one skilled in the art will appreciate the process can include a plurality of valves 362 to control the flow into the conduits.

In an embodiment, the reactant gas mixture can contain a mixture of $CH_4$ and $CO_2$ in a molar ratio ranging between 1/3 and 3/1. The reactant gas mixture is preferably preheated to a temperature ranging between 700-750° C. and is fed in a first catalytic reactor which contains the 3D reforming catalyst. The composition of the catalysts that can be used are described above. A quantity of gaseous water ranging from 0 to 10 wt % of the reactant gas mixture can be added to the reactant gas mixture.

In the first catalytic reactors 324, 326, the reactant gas mixture is reformed to a gas containing CO and $H_2$. In the first reactors 324, 326, small quantities of undesired carbon are formed at the surface of the 3D catalyst, which is typically less than 1 wt % of the carbon fed into the reactors 324, 326. The carbon released at the surface of the 3D catalyst is responsible for a gradual catalyst deactivation. Therefore, as mentioned above, it is preferable to have two reactor lines 334, 336 wherein one line is operated in catalyst regeneration mode and the other line is operating in carbon sequestration and gas reforming mode, thus insuring uninterrupted continuous operation. The 3D catalyst regeneration can be carried out with steam reforming, slow partial oxidation conditions or any other appropriate technique known to one skilled in the art. As mentioned above, a flow sheet including at least two parallel reactor lines 334, 336 is preferable to insure on-line recovery of the carbon filaments formed at the surface of the 2D carbon sequestration catalyst without interrupting the continuous reforming and carbon sequestration process.

The gas mixture exiting from the first catalytic reactors 324, 326 is fed into second catalytic reactors 328, 330 containing the 2D carbon sequestration catalyst. A percentage of the carbon contained $CO/H_2$ mixture is converted into inert solid carbon under filamentous multiwall nanotubes form.

Several applications can be foreseen for the carbon sequestration and dry reforming process. For example, without being limitative, the carbon sequestration and dry reforming process can be applied to recycle the exhaust gases from fuel cells to extract the solid carbon and obtain an ecological fuel cell, even if a fossil fuel is used.

Figure 13:
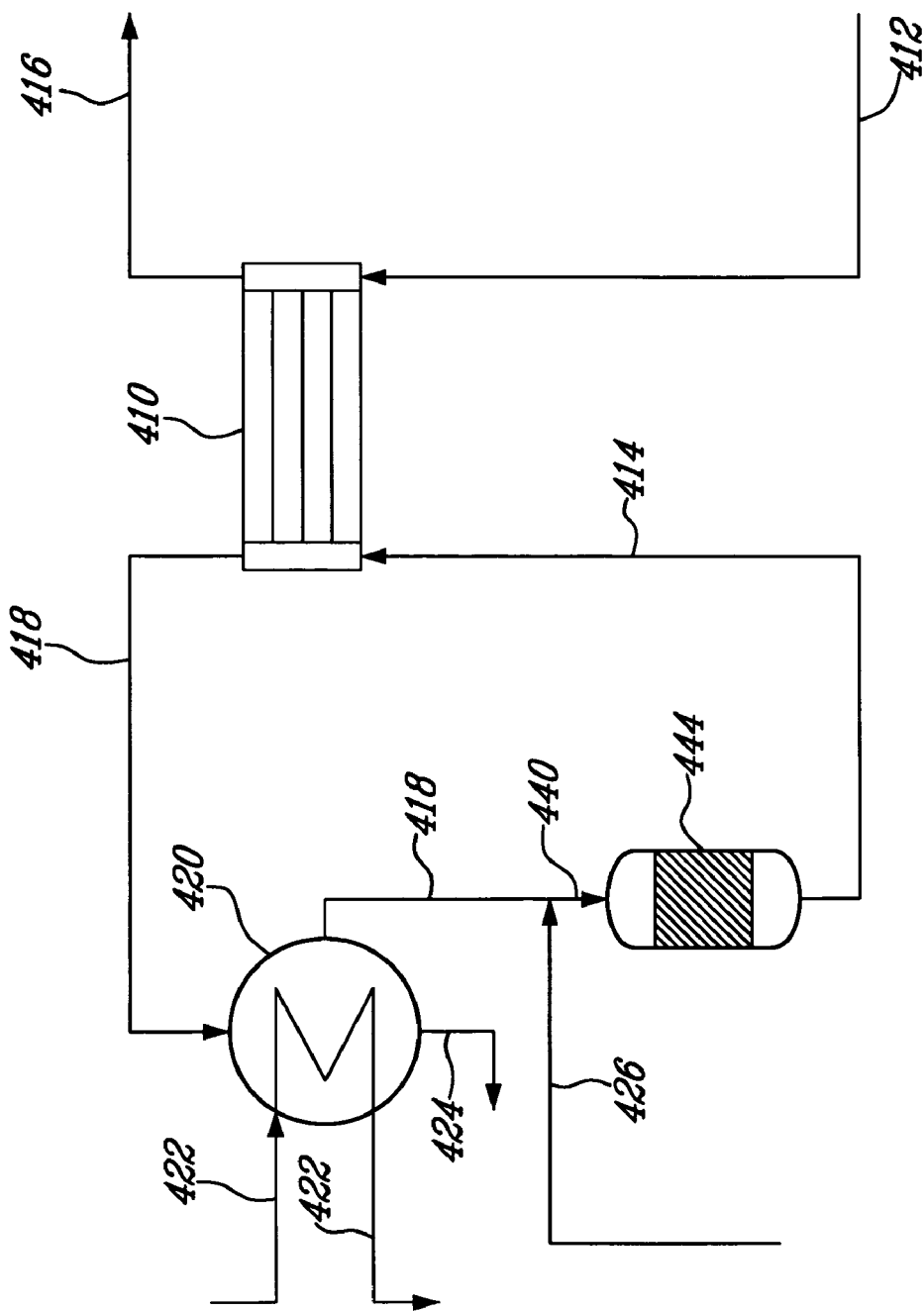
FIG. 13 is a schematic flow sheet of the carbon sequestration and dry reforming process in combination with a solid oxide fuel cell in accordance with an embodiment of the invention.

For example, referring to FIG. 13, it will be seen a schematic flow sheet of the combination of the carbon sequestration and dry reforming process with a solid oxide fuel cell 410. Air 412 and $CO_2$ reformed fuel 414 are injected in the solid oxide fuel cell 410 and depleted air 416 and a mixture of $CO_2$, fuel and water 418 are withdrawn. The $CO_2$ reformed fuel is the product gas mixture of the dry reforming and carbon sequestration as will be described in more details below. The mixture of $CO_2$, fuel and water 418 withdrawn is then processed into a heat exchanger 420 with a cooling fluid 422 for cooling down the mixture 418 and withdrawing a percentage of the water 424 contained therein. Extra fuel 426 can be added to the cooled down mixture 418 to form the reactant gas mixture 440. The reactant gas mixture 440 is introduced into a reactor 444 for dry reforming and carbon sequestration, as described in more details above. A product gas mixture 414 is withdrawn from the reactor 444 and injected into the solid oxide fuel cell 410 as the $CO_2$ reformed fuel.

The process described above allows to simultaneously sequester carbon and reform a gaseous organic material to produce a synthesis gas. The proposed 2D catalysts maximizes the carbon sequestration. Therefore, an important amount of carbon is withdrawn from the biosphere cycle to reduce greenhouse effect gases.

The embodiments of the invention described above are intended to be exemplary only. The scope of the invention is therefore intended to be limited solely by the scope of the appended claims.

We claim:

1. A dry reforming process, comprising the steps of:
   providing a reactant gas mixture comprising carbon dioxide and an organic material;
   activating a two-dimension carbon sequestration catalyst including a steel-based material by heating the steel-based material to a temperature higher than an eutectic point of the steel-based material to at least partially transform the steel-based material into its α-phase; and
   bringing said gas mixture in contact with the two-dimension carbon sequestration catalyst comprising the preactivated steel-based catalytically active material at a temperature wherein solid carbon nanoparticles or nanofilaments are formed at the surface of the two-dimension carbon sequestration catalyst resulting in carbon sequestration;
   wherein the two-dimension carbon sequestration catalyst is substantially internal porosity free to reduce carbon sequestration within the catalyst and increase carbon sequestration superficially on the catalyst.

2. The process as claimed in claim 1, wherein the steel-based catalytically active material comprises at least one of nickel, chrome and cobalt alloying elements.

3. The process as claimed in claim 1, wherein the steel-based catalytically active material is a high temperature resistant iron alloy.

4. The process as claimed in claim 1, wherein the two-dimension carbon sequestration catalyst further comprises a non-porous support having an active metal deposited thereon, the active metal being selected from the group consisting of nickel, platinum group metals promoted nickel, alkali-enhanced nickel, copper-promoted nickel, and tin-promoted nickel.

5. A carbon sequestration process comprising the steps of:
   providing a reactant gas mixture comprising carbon dioxide and an organic material;
   providing at least one two-dimension carbon sequestration catalyst being substantially internal porosity free for sequestering carbon, said catalyst comprising a steel-based material;
   activating the steel-based material of the at least one two-dimension carbon sequestration catalyst material by heating the steel-based material to a temperature higher than an eutectic point of the steel-based material to at least partially transform the steel-based material into its α-phase;
   contacting the reactant gas mixture with the at least one catalyst under conditions wherein solid carbon nanotubes or nanofilaments are formed over the at least one two-dimension carbon sequestration catalyst; and
   recovering the solid carbon particles.

6. The carbon sequestration process as claimed in claim 5, further comprising mechanically withdrawing the solid carbon nanotubes or nanofilaments.

7. The carbon sequestration process as claimed in claim 5, further comprising adding steam to the reactant gas mixture.

8. The carbon sequestration process as claimed in claim 5, further comprising activating the steel-based material by preheating under an inert gas flow.

9. The carbon sequestration process as claimed in claim 5, wherein the organic material and the carbon dioxide in the reactant gas mixture are in a molar ratio ranging between 0.3 and 3.

10. The carbon sequestration process as claimed in claim 5, wherein at least one of the at least one catalyst further comprises a non-porous support having an active metal deposited thereon.

11. The process as claimed in claim 1, further comprising mechanically withdrawing the solid carbon nanotubes or nanofilaments.

12. The process as claimed in claim 1, further comprising adding steam to the reactant gas mixture.

13. The process as claimed in claim 1, further comprising activating the steel-based material by preheating under an inert gas flow.

14. The process as claimed in claim 1, wherein the organic material and the carbon dioxide in the reactant gas mixture are in a molar ratio ranging between 0.3 and 3.

15. In a dry reforming process, comprising forming a reactant gas mixture including carbon dioxide, an organic material and a dry reformed gas, the improvement comprising bringing said reactant gas mixture in contact with a two-dimension carbon sequestration catalyst said catalyst comprising a preactivated steel-based catalytically active material at a temperature wherein a solid carbon nanotubes or nanofilaments are formed at the surface of the two-dimension carbon sequestration catalyst resulting in carbon sequestration, the two-dimension carbon sequestration catalyst being substantially internal porosity free to reduce carbon sequestration within the catalyst and increase carbon sequestration superficially on the surface of the catalyst and wherein the steel-based catalytically active material is activated by heating to a temperature higher than an eutectic point of the steel-based material to at least partially transform the steel-based material into its $\alpha$-phase.

16. The process as claimed in claim 1, wherein the organic material is an alcohol.

17. The carbon sequestration process as claimed in claim 16, wherein the alcohol is ethanol.

18. The process as claimed in claim 5, wherein the organic material is an alcohol.

19. The process as claimed in claim 18, wherein the alcohol is ethanol.

20. The process as claimed in claim 5, wherein the steel-based catalytically active material comprises at least one of nickel, chrome and cobalt alloying elements.

21. The process as claimed in claim 5, wherein the steel-based catalytically active material is a high temperature resistant iron alloy.

22. The process as claimed in claim 10, wherein the active metal is selected from the group consisting of nickel, platinum group metals-promoted nickel, alkali-enhanced nickel, copper-promoted nickel, and tin-promoted nickel.

23. A dry reforming process, comprising:
contacting a reactant gas mixture including carbon dioxide and an organic material with a two-dimension steel based material including $\alpha$-phase steel and being substantially internal porosity free at a temperature wherein solid carbon nanotubes or nanofilaments including iron are deposited superficially on the steel based material.

24. The process as claimed in claim 23, wherein the steel-based material comprises at least one of nickel, chrome and cobalt alloying elements.

25. The process as claimed in claim 23, wherein the steel-based material is a high temperature resistant iron alloy.

26. The process as claimed in claim 23, further comprising mechanically withdrawing the solid carbon nanotubes or nanofilaments.

27. The process as claimed in claim 23, further comprising adding steam to the reactant gas mixture.

28. The process as claimed in claim 23, further comprising activating the steel-based material by preheating under an inert gas flow.

29. The process as claimed in claim 23, wherein the organic material and the carbon dioxide in the reactant gas mixture are in a molar ratio ranging between 0.3 and 3.

30. The process as claimed in claim 23, wherein the organic material is an alcohol.

31. The process as claimed in claim 1, wherein the solid carbon nanoparticles or nanofilaments comprise iron.

32. The process as claimed in claim 5, wherein the solid carbon nanotubes or nanofilaments comprise iron.

33. The process as claimed in claim 15, wherein the solid carbon nanotubes or nanofilaments comprise iron.

34. The process as claimed in claim 15, wherein the steel-based catalytically active material comprises at least one of nickel, chrome and cobalt alloying elements.

35. The process as claimed in claim 15, wherein the steel-based catalytically active material is a high temperature resistant iron alloy.

36. The process as claimed in claim 15, wherein the two-dimension carbon sequestration catalyst further comprises a non-porous support having an active metal deposited thereon, the active metal being selected from the group consisting of nickel, platinum group metals promoted nickel, alkali-enhanced nickel, copper-promoted nickel, and tin-promoted nickel.

37. The process as claimed in claim 15, further comprising mechanically withdrawing the solid carbon nanotubes or nanofilaments.

38. The process as claimed in claim 15, further comprising adding steam to the reactant gas mixture.

39. The process as claimed in claim 15, further comprising activating the steel-based material by preheating under an inert gas flow.

40. The process as claimed in claim 15, wherein the organic material and the carbon dioxide in the reactant gas mixture are in a molar ratio ranging between 0.3 and 3.

41. The process as claimed in claim 15, wherein the organic material is an alcohol.

* * * * *